(12) United States Patent
Pawloski et al.

(10) Patent No.: US 11,045,997 B2
(45) Date of Patent: Jun. 29, 2021

(54) WATER SOLUBLE SUPPORT MATERIALS FOR HIGH TEMPERATURE ADDITIVE MANUFACTURING APPLICATIONS

(71) Applicant: Stratasys, Inc., Eden Prairie, MN (US)

(72) Inventors: Adam R. Pawloski, Lake Elmo, MN (US); Theresa Sherar, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 221 days.

(21) Appl. No.: 16/064,275

(22) PCT Filed: Dec. 20, 2016

(86) PCT No.: PCT/US2016/067815
§ 371 (c)(1),
(2) Date: Jun. 20, 2018

(87) PCT Pub. No.: WO2017/112687
PCT Pub. Date: Jun. 29, 2017

(65) Prior Publication Data
US 2018/0370120 A1 Dec. 27, 2018

Related U.S. Application Data

(60) Provisional application No. 62/387,445, filed on Dec. 24, 2015.

(51) Int. Cl.
*B29C 64/40* (2017.01)
*B29C 64/118* (2017.01)
(Continued)

(52) U.S. Cl.
CPC ............ *B29C 64/118* (2017.08); *B29C 64/40* (2017.08); *B33Y 70/00* (2014.12); *C08F 220/18* (2013.01);
(Continued)

(58) Field of Classification Search
CPC ............................ B29C 64/40; B29K 2039/06
See application file for complete search history.

(56) References Cited

U.S. PATENT DOCUMENTS

| 3,892,905 A | 7/1975 | Albert |
| 4,663,538 A | 5/1987 | Cotton et al. |

(Continued)

FOREIGN PATENT DOCUMENTS

| GB | 1312034 | 4/1973 |
| WO | 00/62994 A1 | 10/2000 |

(Continued)

OTHER PUBLICATIONS

International Search Report and Written Opinion dated Apr. 19, 2017 for corresponding International Application No. PCT/US2016/067815, filed Dec. 20, 2016.
(Continued)

*Primary Examiner* — Alex A Rolland
(74) *Attorney, Agent, or Firm* — Peter J. Ims; Westman, Champlin & Koehler, P.A.

(57) ABSTRACT

A support material for use in an additive manufacturing system includes a copolymer of vinyl pyrrolidone (VP) monomers and elastomeric monomers. The elastomeric monomers and the VP monomers are covalently bonded and copolymerized. The support material is thermally stable even at temperatures above 80° C. and is disintegrable in aqueous solutions such as tap water.

16 Claims, 12 Drawing Sheets

(51) Int. Cl.
    *C08F 226/10*     (2006.01)
    *B33Y 70/00*     (2020.01)
    *C08F 226/06*     (2006.01)
    *C08F 220/18*     (2006.01)
    *B33Y 10/00*     (2015.01)
    *B29K 105/00*     (2006.01)

(52) U.S. Cl.
    CPC .......... *C08F 226/06* (2013.01); *C08F 226/10* (2013.01); *B29K 2039/06* (2013.01); *B29K 2105/258* (2013.01); *B33Y 10/00* (2014.12); *C08F 220/1804* (2020.02)

(56) References Cited

U.S. PATENT DOCUMENTS

| | | | |
|---|---|---|---|
| 5,080,809 | A | 1/1992 | Stahl et al. |
| 5,121,329 | A | 6/1992 | Crump |
| 5,132,143 | A | 7/1992 | Deckard |
| 5,204,055 | A | 4/1993 | Sachs et al. |
| 5,503,785 | A | 4/1996 | Crump et al. |
| 6,004,124 | A | 12/1999 | Swanson et al. |
| 6,790,403 | B1 | 9/2004 | Priedeman, Jr. et al. |
| 7,122,246 | B2 | 10/2006 | Comb et al. |
| 7,384,255 | B2 | 6/2008 | LaBossiere et al. |
| 7,604,470 | B2 | 10/2009 | LaBossiere et al. |
| 7,625,200 | B2 | 12/2009 | Leavitt |
| 7,896,209 | B2 | 3/2011 | Batchelder et al. |
| 8,133,504 | B2 | 3/2012 | Kettlewell et al. |
| 8,153,182 | B2 | 4/2012 | Comb et al. |
| 8,186,415 | B2 | 5/2012 | Marutani et al. |
| 8,221,669 | B2 | 7/2012 | Batchelder et al. |
| 8,221,858 | B2 | 7/2012 | Mannella et al. |
| 8,236,227 | B2 | 8/2012 | Batchelder et al. |
| 8,246,888 | B2 | 8/2012 | Hopkins et al. |
| 8,419,996 | B2 | 4/2013 | Swanson et al. |
| 8,459,280 | B2 | 6/2013 | Swanson et al. |
| 8,647,102 | B2 | 2/2014 | Swanson et al. |
| 8,658,250 | B2 | 2/2014 | Batchelder et al. |
| 9,138,981 | B1 | 9/2015 | Hirsch et al. |
| 10,343,301 | B2 | 7/2019 | Gunther et al. |
| 2007/0286891 | A1 | 12/2007 | Kettlewell et al. |
| 2010/0096072 | A1 | 4/2010 | Hopkins et al. |
| 2010/0283172 | A1 | 11/2010 | Swanson |
| 2011/0074065 | A1 | 3/2011 | Batchelder et al. |
| 2011/0186081 | A1 | 8/2011 | Dunn et al. |
| 2012/0070523 | A1 | 3/2012 | Swanson et al. |
| 2012/0070619 | A1 | 3/2012 | Mikulak et al. |
| 2012/0164256 | A1 | 6/2012 | Swanson et al. |
| 2012/0231225 | A1 | 9/2012 | Mikulak et al. |
| 2013/0077996 | A1 | 3/2013 | Hanson et al. |
| 2013/0077997 | A1 | 3/2013 | Hanson et al. |
| 2013/0161439 | A1 | 6/2013 | Beery et al. |
| 2013/0161442 | A1 | 6/2013 | Mannella et al. |
| 2013/0186549 | A1 | 7/2013 | Comb et al. |
| 2013/0186558 | A1 | 7/2013 | Comb et al. |
| 2013/0317164 | A1 * | 11/2013 | Hermes ................. C08F 222/06 524/549 |
| 2013/0333798 | A1 | 12/2013 | Bosveld et al. |
| 2015/0306622 | A1 | 10/2015 | Hirata |
| 2015/0375419 | A1 | 12/2015 | Gunther et al. |
| 2016/0194492 | A1 | 7/2016 | Smith, Jr. et al. |
| 2017/0057176 | A1 * | 3/2017 | Hermant ................. B29C 64/40 |
| 2018/0222082 | A1 | 8/2018 | Gunther et al. |
| 2018/0370120 | A1 | 12/2018 | Pawloski et al. |

FOREIGN PATENT DOCUMENTS

| | | | |
|---|---|---|---|
| WO | 2006013337 A2 | 2/2006 | |
| WO | 2014131388 A1 | 9/2014 | |
| WO | 2015012862 A1 | 1/2015 | |
| WO | WO-2015124557 A1 * | 8/2015 | ............ C08F 218/08 |
| WO | 2017112687 A1 | 6/2017 | |
| WO | 2017112689 A1 | 6/2017 | |

OTHER PUBLICATIONS

U.S. Patent Office issued prosecution for U.S. Appl. No. 16/064,286, filed Jun. 20, 2018, including: Non-Final Rejection dated Apr. 2, 2020, 11 pages.

International Search Report and Written Opinion dated Mar. 21, 2017 for corresponding International Application No. PCT/US2016/067818, filed Dec. 20, 2016.

Prosecution history for U.S. Appl. No. 16/064,286, filed Jun. 20, 2018, including: Final Rejection dated Oct. 5, 2020 and Notice of Allowance and Fee(s) Due dated Dec. 23, 2020.

* cited by examiner

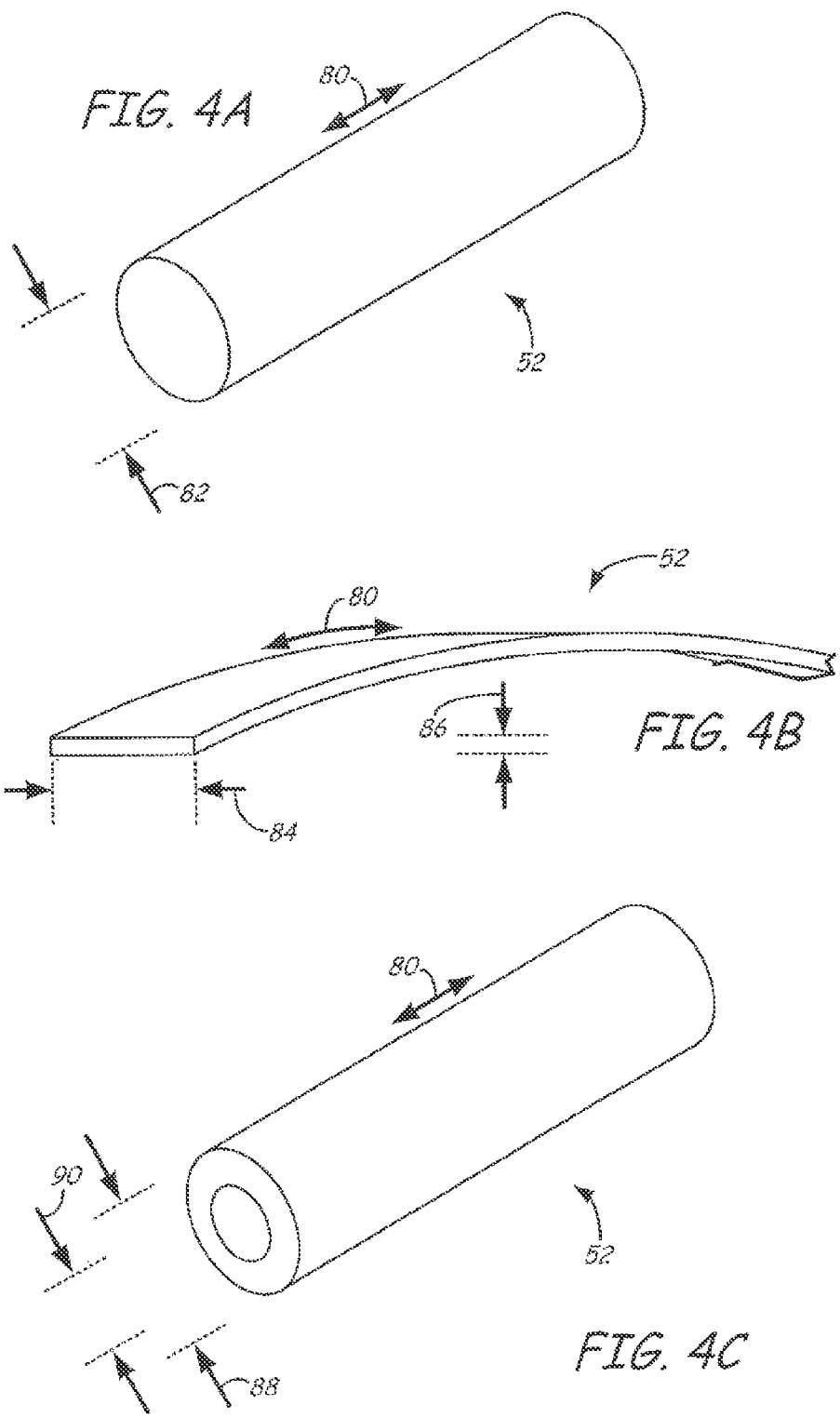

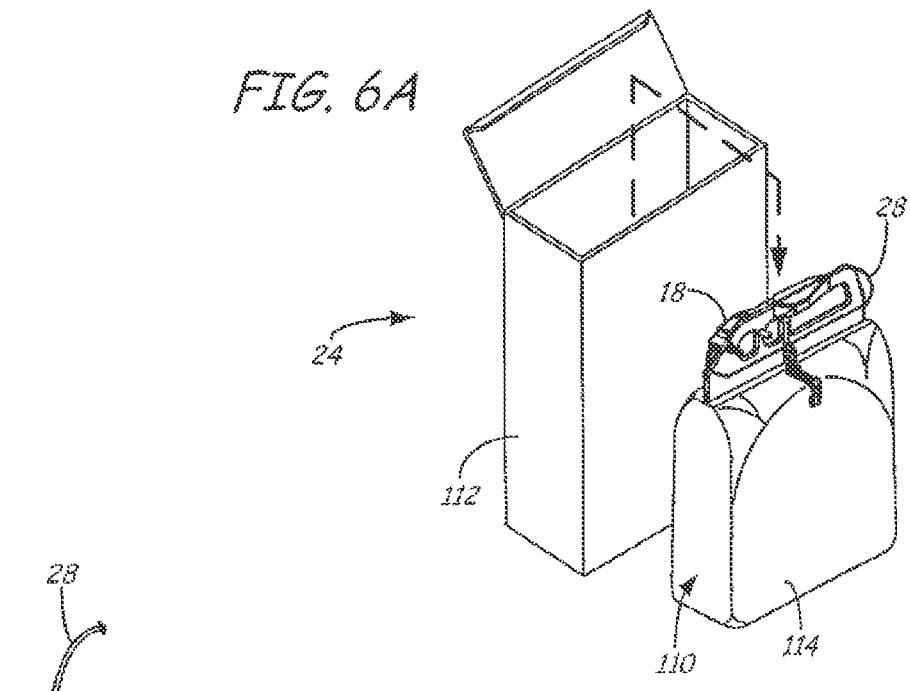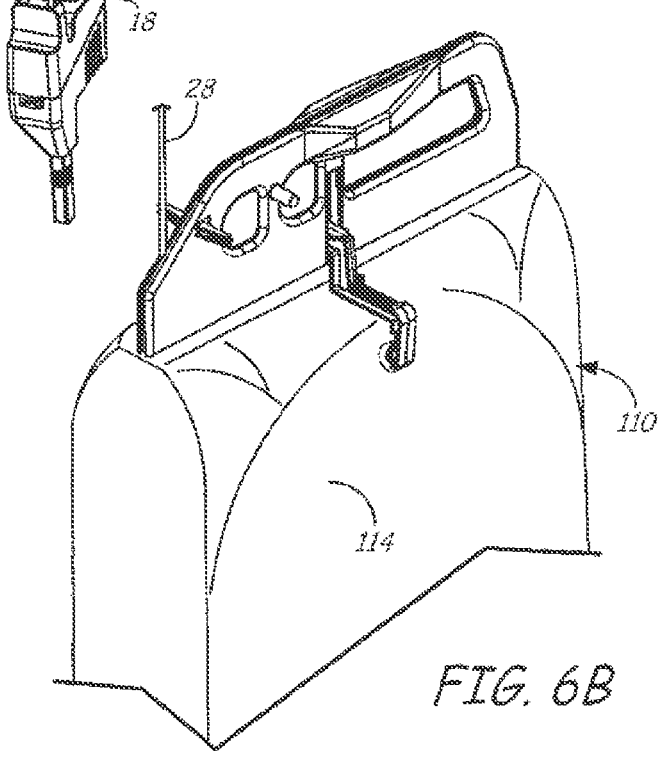

an alternating copolymer     ABABABABABABABABABABAB a block copolymer     AAAABBBBAAAABBBBAAAABBBB a random copolymer     AABABABBAABAAABBAABABBBA a graft copolymer     AAAAAAAAAAAAAAAAAAAAAAAA
```
                         B           B           B
                         B           B           B
                         B           B           B
                         B           B           B
                         B           B           B
                         B           B           B
                         B           B           B
                         B           B           B
```

FIG. 7

WATER SOLUBLE SUPPORT MATERIALS FOR HIGH TEMPERATURE ADDITIVE MANUFACTURING APPLICATIONS

CROSS-REFERENCE TO RELATED APPLICATION(S)

This Application is a 371 National Stage Application of International Application No. PCT/US2016/067815, filed on Dec. 20, 2016, published as International Publication No. WO2017/112687, which claims priority to U.S. patent application Ser. No. 62/387,445, filed on Dec. 24, 2015, the contents of which are incorporated by reference in their entireties.

BACKGROUND

The present disclosure relates to additive manufacturing systems for printing three-dimensional (3D) parts and support structures. In particular, the present disclosure relates to support materials for use in additive manufacturing systems, consumable assemblies retaining the support materials, and methods of manufacturing and using the support materials and assemblies in additive manufacturing systems to print articles.

Additive manufacturing systems are used to print or otherwise build printed parts from digital representations of the printed parts (e.g., AMF and STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the printed part is initially sliced into multiple horizontal layers. For each sliced layer, a tool path is then generated, which provides instructions for the particular additive manufacturing system to print the given layer.

For example, in an extrusion-based additive manufacturing system, a printed part may be printed from a digital representation of the printed part in a layer-by-layer manner by extruding a thermoplastic material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. The host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

An aspect of the present disclosure relates to a water soluble support material having a polymeric matrix. The polymeric matrix includes a copolymer, the copolymer comprises vinyl pyrrolidone (VP) monomers and elastomeric monomers, wherein the support material is disintegrable in an aqueous solution and wherein the VP monomers and the elastomeric monomers are covalently bonded. The elastomeric monomers may include various types of monomers that polymerize to impart rubbery domains or segments along the polymer backbone, side groups, branches, or from its intermolecular structure. Types of monomers may be chosen generally from the classes of acrylic monomers, allyl monomers, anhydride monomers, norbornene monomers, vinyl esters, vinyl ethers, and other monomers containing at least one polymerizable double bond. In one embodiment, elastomeric monomers are alkyl acrylates, such as n-butyl acrylate. The elastomeric monomers may also include monomers selected from allyl chloroacetates, allyl vinyl ethers, alkoxyalkyl acrylates, acrylic acid, acrylic acid esters, and cyanoalkyl acrylates. Elastomeric monomers may further include ethylene, vinyl acetate, alpha-olefins, conjugated dienes, and allyl ethers. A single elastomeric monomer, or combinations of monomers, may be used to constitute the desired rubbery properties. The VP monomers may include between about 15 weight percent and about 95 weight percent of the copolymer. The elastomeric monomers may include between about 5 weight percent and about 85 weight percent of the copolymer. The support material may include one or more additives comprising a rheology modifier, an impact modifier, an elastomer and combinations thereof. The rheology modifier may include between about 0.25 weight percent and about 30 weight percent of the support material. The impact modifier may include about 15% by weight or less of the weight of the support material. The impact modifier may include a block copolymer impact modifier, acrylic core-shell impact modifiers and combinations thereof. The aqueous solution may include tap water. The glass transition temperature of the material may be between about 80° C. and about 200° C. The aqueous solution may be selected from tap water and/or an aqueous solution with a pH between about pH 5 and about pH 9.

Another aspect of the present disclosure relates to an assembly comprising support material for use in an additive manufacturing system. The support material comprises a copolymer of vinyl pyrrolidone (VP) monomers and elastomeric monomers wherein the elastomeric monomers and VP monomers are covalently bonded together, and wherein the support material is disintegrable in an aqueous solution. The elastomeric monomers may include various types of monomers that polymerize to impart rubbery domains or segments along the polymer backbone, side groups, branches, or from its intermolecular structure. Types of monomers may be chosen generally from the classes of acrylic monomers, allyl monomers, anhydride monomers, norbornene monomers, vinyl esters, vinyl ethers, and other monomers containing at least one polymerizable double bond. In one embodiment, elastomeric monomers are alkyl acrylates, such as n-butyl acrylate. The elastomeric monomers may also include monomers selected from allyl chloroacetates, allyl vinyl ethers, alkoxyalkyl acrylates, acrylic acid, acrylic acid esters, and cyanoalkyl acrylates. Elastomeric monomers may further include ethylene, vinyl acetate, alpha-olefins, conjugated dienes, and allyl ethers. A single elastomeric monomer, or combinations of monomers, may be used to constitute the desired rubbery properties. The VP monomers may include between about 15 weight percent and about 95 weight percent of the copolymer. The elastomeric monomers may include between about 5 weight percent and about 85 weight percent of the copolymer. The support material may include one or more additives comprising a rheology modifier, an impact modifier, an elastomer and combinations thereof. The rheology modifier may include between about 0.25 weight percent and about 30 weight percent of the support material. The impact modifier may include about 15% by weight or less of the weight of the support material. The impact modifier may include a block copolymer impact modifier, acrylic core-shell impact modifiers and combinations thereof. The aqueous solution may include tap water. The glass transition temperature of the material may be between about 80° C. and about 200° C. The aqueous solution may be selected from tap water and/or an aqueous solution with a pH between about pH 5 and about pH 9.

Another aspect of the present disclosure relates to a method for printing a three-dimensional part with an additive manufacturing system. The method includes providing a support material comprising a copolymer, wherein the copolymer comprises copolymerized VP monomeric units and elastomeric monomer units wherein the elastomeric monomers and VP monomers are covalently bonded together, wherein the support material is disintegrable in an aqueous solution and provided in a media form suitable for the additive manufacturing system. The method also includes processing the support material in the additive manufacturing system with a model material to print the three-dimensional part in a layer by layer manner. The elastomeric monomers may include various types of monomers that polymerize to impart rubbery domains or segments along the polymer backbone, side groups, branches, or from its intermolecular structure. Types of monomers may be chosen generally from the classes of acrylic monomers, allyl monomers, anhydride monomers, norbornene monomers, vinyl esters, vinyl ethers, and other monomers containing at least one polymerizable double bond. In one embodiment, elastomeric monomers are alkyl acrylates, such as n-butyl acrylate. The elastomeric monomers may also include monomers selected from allyl chloroacetates, allyl vinyl ethers, alkoxyalkyl acrylates, acrylic acid, acrylic acid esters, and cyanoalkyl acrylates. Elastomeric monomers may further include ethylene, vinyl acetate, alpha-olefins, conjugated dienes, and allyl ethers. A single elastomeric monomer, or combinations of monomers, may be used to constitute the desired rubbery properties. The VP monomers may include between about 15 weight percent and about 95 weight percent of the copolymer. The elastomeric monomers may include between about 5 weight percent and about 85 weight percent of the copolymer. The support material may include one or more additives comprising a rheology modifier, an impact modifier, an elastomer and combinations thereof. The rheology modifier may include between about 0.25 weight percent and about 30 weight percent of the support material. The impact modifier may include about 15% by weight or less of the weight of the support material. The impact modifier may include a block copolymer impact modifier, acrylic core-shell impact modifiers and combinations thereof. The aqueous solution may include tap water. The glass transition temperature of the material may be between about 80° C. and about 200° C. The aqueous solution may be selected from tap water and/or an aqueous solution with a pH between about pH 5 and about pH 9.

Definitions

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

The terms "preferred" and "preferably", "example" and "exemplary" refer to embodiments that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyetherimide is interpreted to include one or more polymer molecules of the polyetherimide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyetherimide", "one or more polyetherimides", and "polyetherimide(s)" may be used interchangeably and have the same meaning.

The terms "about" and "substantially" are used herein with respect to measurable values and ranges due to expected variations known to those skilled in the art (e.g., limitations and variability in measurements).

The term "providing", such as for "providing a support material", when recited in the claims, is not intended to require any particular delivery or receipt of the provided part. Rather, the term "providing" is merely used to recite parts that will be referred to in subsequent elements of the claim(s), for purposes of clarity and ease of readability.

Unless otherwise specified, temperatures referred to herein are based on atmospheric pressure (i.e. one atmosphere).

"Soluble" as referred to herein can be used interchangeably with "disintegrable" and "dissolvable" and relates to materials that disintegrate in a solution or dispersion. Upon disintegration, the support material can break apart into smaller pieces and/or particles of polymer in the solution or dispersion. Some or all of the support material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9. Although these pH's are slightly basic or slightly acidic, the defining feature of the water soluble materials is that they do not require an acidic or basic solution to disintegrate and can disintegrate in water at about neutral pH, e.g. tap water.

A "species" of polyvinylpyrrolidone (PVP) polymer as used herein is defined by a particular average molecular weight. Thus, support material having four species of PVP polymers indicates the addition of PVP polymers of four different average molecular weights.

"High temperature build environment" as referred to herein relates to build environments of about 80° C. or greater in additive manufacturing systems.

"Heat deflection temperature" or "heat distortion temperature" (HDT) is the temperature at which a polymer sample deforms under a specified load and is as determined by the test procedure outlined in ASTM D648.

"Thermally stable" as referred to herein relates to the support material having a HDT compatible with the desired build environment such that they do not exceed their thermal-degradation kinetics thresholds or result in other chemical reactions, such as crosslinking of the polymer that can inhibit disintegration of the support material. Degradation of the support material can lead to decomposition, production of volatile species, color change, charring and the like.

"VP/elastomer" copolymer as referred to herein relates to a copolymer in which vinyl pyrrolidone monomers and elastomer monomers have been copolymerized to form the copolymer.

All patents, publications or other documents mentioned herein are incorporated by reference.

BRIEF DESCRIPTION OF THE DRAWINGS

FIG. 4A is a perspective view of a segment of a cylindrical filament of the support material.

FIG. 4B is a perspective view of a segment of a ribbon filament of the support material.

FIG. 4C is a perspective view of a segment of a hollow filament of the support material.

FIG. 6A is a perspective view of a second embodied consumable assembly for retaining a supply of the support material in filament form.

FIG. 6B is an expanded perspective view of the second embodied consumable assembly, illustrating an integrated print head and guide tube.

FIG. 7 is schematic illustration of different types of copolymers.

DETAILED DESCRIPTION

Figure 1:
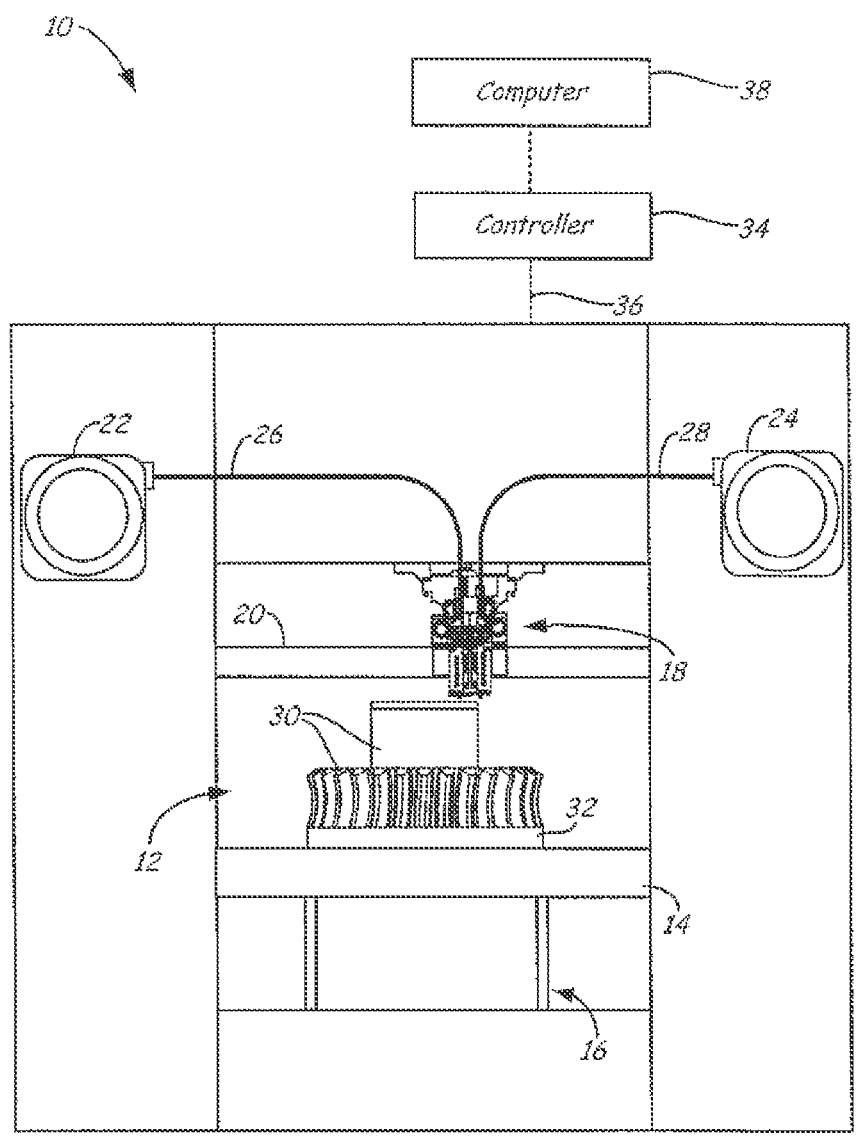
FIG. 1 is a front view of an extrusion-based additive manufacturing system configured to print printed parts and support structures, where the support structures are printed from a support material of the present disclosure.

The present disclosure is directed to a support material, and more preferably a water soluble support material. The support material can be used for printing support structures in high temperature build environments of additive manufacturing systems. The support material of the present disclosure provides improved toughness and thermal stability along with improved dissolution rates in water, alkaline solutions, or other aqueous solutions or dispersions. Preferable support materials of the present disclosure compositionally includes a polymeric matrix. The polymeric matrix includes copolymers derived from the copolymerization of monomers of vinyl pyrrolidone and one or more monomers of a rubbery elastomer. The elastomers can be, for example, n-butyl acrylate. The rubbery elastomer advantageously can become part of the polymer, i.e. attached by covalent bonds, and therefore during dissolution of the support material in tap water, the printed sacrificial support more readily dissolves into solution or disintegrates into a dispersion.

The support material of the present disclosure functions as a sacrificial material for an associated model material. Support material can be desirable where overhanging features are required, where significant angular slopes exist in the printed parts and where it is essential to preserve delicate features in the printed part, such as small orifices or controlled pore structures, and in some situations, to laterally encase the printed part.

Once the part has been printed, the support structure of the support material may be removed to reveal the completed printed part without damaging any of the critical or delicate geometrical features of the printed part. To accomplish this removal, the disclosed support material is dissolvable in aqueous solutions, allowing the support structure to be at least partially and typically completely dissolved away from the printed part.

In order to effectively print a support structure in a layer-by-layer manner in coordination with a printed part, the support material preferably has a glass transition temperature that is similar to that of the model material. This allows the part and support materials to have similar heat deflection temperatures and other thermal characteristics when printed together as a material pair. For example, similar glass transition and heat deflection temperatures allow the part and support materials to be printed together in the same heated environment while preventing excessive distortions and curling.

Soluble support materials that have traditionally been paired with model materials suitable in high temperature build environments, such as acrylonitrile-butadiene-styrene (ABS) model materials, which typically have glass transition temperatures around 105° C. have been soluble in, for example, basic solutions. Disintegration of the support materials in basic solutions results in caustic waste that requires time and money for disposal and also concerns about safety. Typical water soluble support materials are not thermally stable and cannot be melt processed at the higher melt processing temperatures required for use with printed parts printed from model materials which require melt processing temperatures that exceed 200° C. and build environments that exceed 80° C. The support materials may also be compatible with model materials that are printed in build environments less than 80° C.

Alternatively, parts printed with, for example ABS model materials, can be printed in combination with break-away support materials. Break away support materials can be designed for greater thermal stability at the higher temperatures, but these materials are not soluble in liquids that facilitate support removal. Rather, support structures printed from the break-away support materials are typically heated to a moderate temperature and physically broken apart from the corresponding printed parts. While these break-away support materials are suitable for many applications, they do not provide the capability of an automated or hands-free removal process that is achievable with soluble support materials. Additionally, in some cases, the physical removal of the break-away support materials can prevent printed parts from having critical or delicate geometrical features, such as features that can engage one another (e.g., gear engagements), or highly-complex interior cavities and pockets. The disclosed geometric features are exemplary and are not limiting in nature.

The support materials of the present disclosure, however, are uniquely engineered for pairing with model materials (e.g., same/similar glass transition temperatures) in high temperature build environments, e.g. at least about 80° C. or greater, while also being able to disintegrate in aqueous solutions at about neutral pH, e.g. tap water, without the need for the inclusion of caustic basic solutions for sufficient disintegration. The aqueous solution of the present disclosure can be slightly basic or slightly acidic, for example between about a pH of 5 and about a pH of 9. The support materials can disintegrate in aqueous solution, e.g. tap water, at about neutral pH and does not require the presence of a basic or acidic environment or heating of the aqueous solution. The support material can have improved toughness and improved dissolution rates in the aqueous solution for hands-free removal.

The soluble support materials described herein advantageously are disintegrable in tap water and in addition, can be melt processed (e.g., melted and extruded from a print head) at temperatures of about 180° C. or greater and used in high temperature build environments of greater than about 80° C. without exceeding their thermal-degradation kinetics thresholds (TDKTs). Accordingly, the support material can be melted and extruded from a print head (or with any other suitable additive manufacturing process) in a layer-by-layer manner in coordination with a model material with no appreciable thermal degradation or distortion.

The TDKT is a time-temperature parameter that defines a rate of thermal degradation of a polymeric material, such as by depolymerization, backbone chain scission, pendant-group stripping, polymer cross linking, and/or oxidation processes. The thermal degradation of a support material can reduce the desired physical properties of the material, such as changing the glass transition temperature, dissolution characteristics, physical appearance, adhesive properties, and the like. These effects can prevent the degraded support material from functioning as a sacrificial support structure.

The TDKT reaction rate typically follows the first-order Arrhenius equation, which is substantially linear with time and exponential with temperature. As an example, for a support material exposed to a selected elevated temperature for a selected duration, increasing the exposure temperature by a small amount (e.g., about 10° C.) or reducing the exposure duration by about 50% (e.g., doubling the flow rate) may net about the same thermal reaction rates on the support material, although the particular net thermal effects may vary depending on the support material composition.

In a fused deposition modeling process, the duration component of the TDKT for a support material is typically the time required to melt and extrude the support material from a print head. This can range from about 3-10 seconds, but can be longer in some cases, such as 90-120 seconds. These durations, along with the lower melt processing temperatures, allow the current soluble support materials to be printed while remaining below their TDKTs. As such, soluble support structures may be printed without significant thermal degradation. This is also in addition to any melt processing required for filament production, which can also expose the support material to elevated temperatures for 30-120 seconds, for example.

A further benefit of the soluble support materials of the present disclosure are their ability to exhibit a heat distortion temperature (HDT) in excess of 90° C. During the printing process, a heated build environment is used when the model material and the support material are deposited in a layer by layer manner. An exemplary heated build environment, e.g. a chamber, in a fused deposition modeling system is described below. As layers of model and support material are deposited upon each other during printing, the support material preferably does not flow, bend, or creep and can maintain strong adhesion to the model material such that distortion of the model is minimized. A large value of the HDT of the support material can reduce the excessive distortions and/or curling of the support material in the high temperature build environment.

As discussed further below, the support material compositionally includes a polymeric matrix. The polymeric matrix includes copolymers derived from the copolymerization of monomers of vinyl pyrrolidone and one or more monomers of a rubbery elastomer. The elastomers can be, for example, n-butyl acrylate. The rubbery elastomer advantageously can become part of the polymer, i.e. attached by covalent bonds, and therefore during dissolution of the support material in tap water, the printed sacrificial support more readily dissolves into solution or disintegrates into a dispersion.

The support material may also include one or more additives that include a rheology modifying additive, an impact modifier, an elastomer and the like. This support material has sufficient thermal stability to withstand build environments in additive manufacturing applications of about 80° C. or greater. The support material has a sufficient glass transition temperature ($T_g$) or heat distortion temperature (HDT) to withstand the forces exerted on support materials during printing within a heated build environment without deformation or flow, in conjunction with desirable dissolution rates in water or aqueous solutions or dispersions for removal of the support material from the printed 3D part.

In some embodiments, support materials for high temperature build environments are support materials for printing at temperatures greater than about 80° C., preferably greater than about 120° C. The support material may be used in conjunction with a variety of model materials. Examples of suitable model materials include thermoplastic materials, such as acrylonitrile-butadiene-styrene (ABS) copolymers (e.g., ABS-M30 manufactured by Stratasys, Inc. located in Eden Prairie, Minn.), acrylonitrile styrene acrylate (ASA), polylactic acid (PLA), polycarbonates (PC), blends of PC and ABS (PC-ABS), polysulfones, polyethersulfones, polyphenylsulfones, polyetherimides, polyamides modified variations thereof, polystyrenes, polypropylenes, copolyesters, and blends thereof. In addition, the solubility of the support material is sufficient for use of removal of the support material in an automated process or hands-free manner in aqueous solutions or dispersions, e.g. water, as described below.

The support material of the present disclosure may be configured for use with several different additive manufacturing techniques, such as extrusion-based additive manufacturing systems, high-speed sintering systems, selective laser sintering systems, electrophotography-based additive manufacturing systems, and the like. Further, the use of the disclosed material is not limited to additive manufacturing. As shown in FIG. 1, system 10 is an example of an extrusion-based additive manufacturing system for printing or otherwise building 3D parts and support structures using a layer-based, additive manufacturing technique, where the support structures may be printed from the support material of the present disclosure. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner. Example techniques for locally heating a deposition region include heating platen 14 and/or with directing heat air jets towards platen 14 and/or the printed parts/support structures being printed). The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner. In some embodiments, platen 14 may also include a flexible polymeric film or liner on which the printed parts and support structures are printed. In the shown example, print head 18 is a dual-tip extrusion head configured to receive consumable filaments from consumable assemblies 22 and 24 (e.g., via guide tubes 26 and 28) for printing printed part 30 and support structure 32 on platen 14. Consumable assembly 22 may contain a supply of a model material, such as a high-performance model material, for printing printed part 30 from the model material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Figure 2:
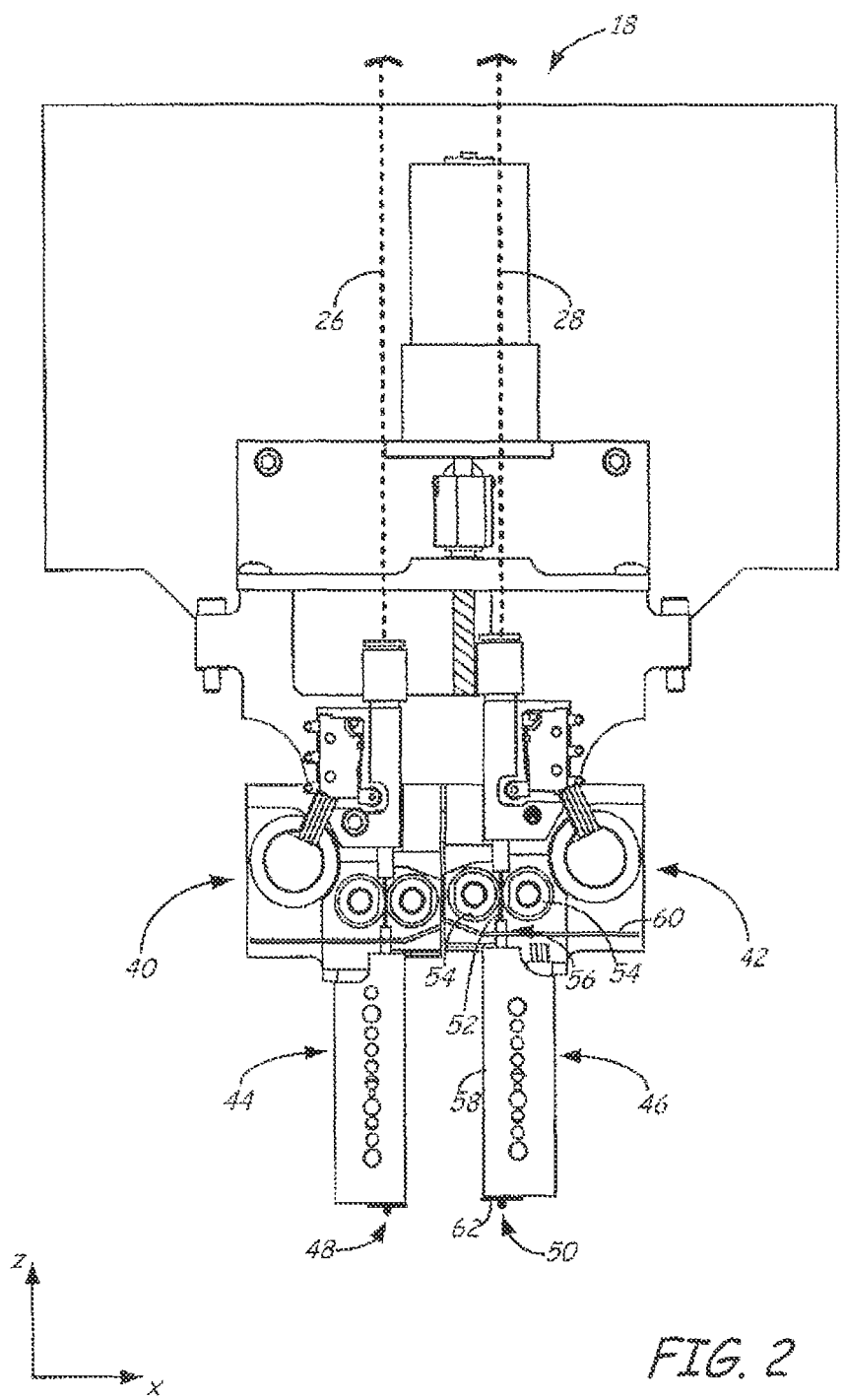
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. Nos. 8,419,996 and 8,647,102.

Figure 3:
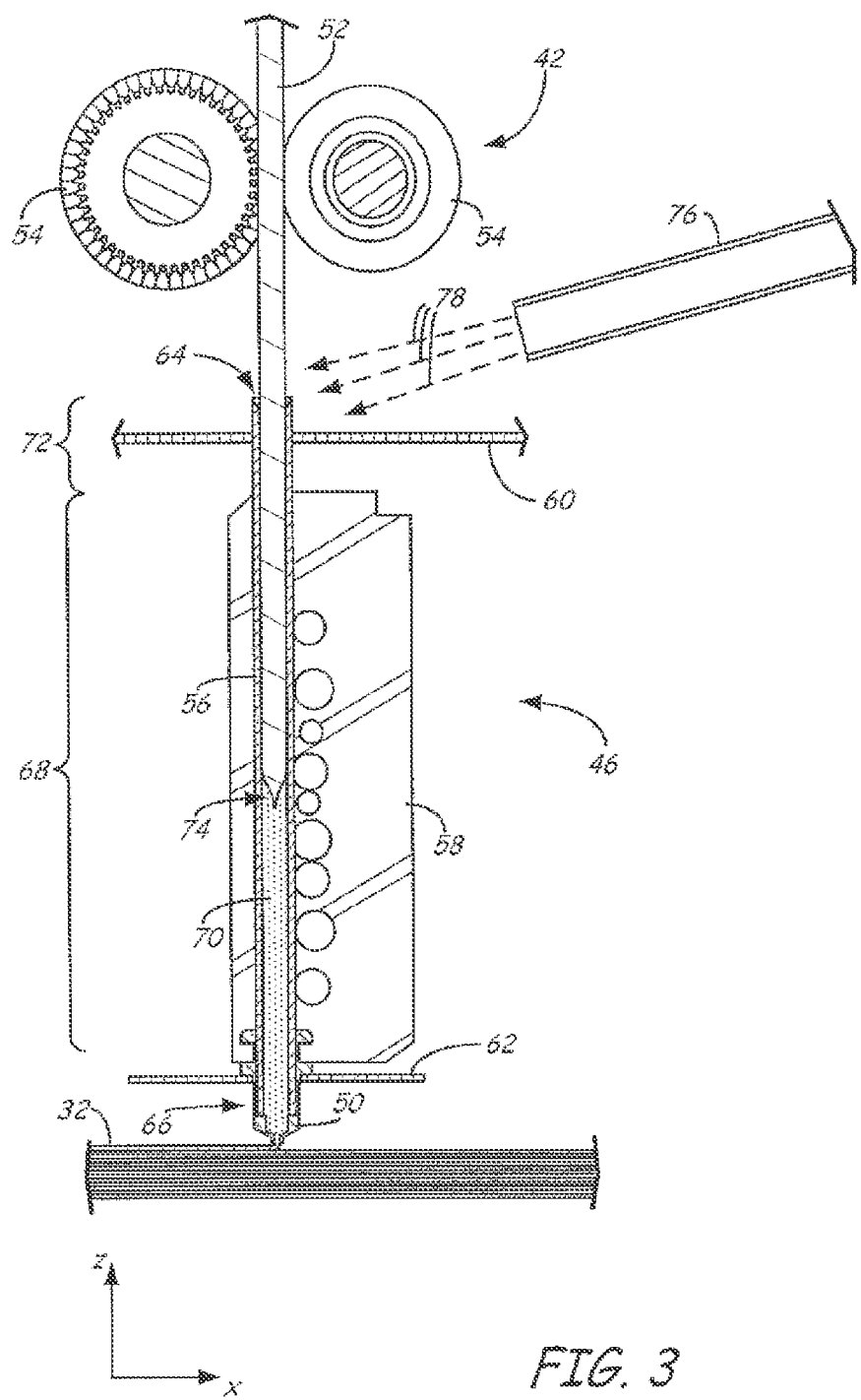
FIG. 3 is an expanded sectional view of a drive mechanism, a liquefier assembly, and a nozzle of the print head for use in the extrusion-based additive manufacturing system.

In the shown dual-tip embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the model material, and drive mechanism 42, liquefier assembly 46, and nozzle 50 are for receiving and extruding the support material of the present disclosure. In this embodiment the model material and the support material each preferably have a filament geometry for use with print head 18. For example, as shown in FIGS. 2 and 3, the support material may be provided as filament 52.

During operation, controller 34 may direct wheels 54 of drive mechanism 42 to selectively draw successive segments filament 52 (of the support material) from consumable assembly 24 (via guide tube 28), and feed filament 52 to liquefier assembly 46. Liquefier assembly 46 may include liquefier tube 56, thermal block 58, heat shield 60, and tip shield 62, where liquefier tube 56 includes inlet end 64 for receiving the fed filament 52. Nozzle 50 and tip shield 62 are accordingly secured to outlet end 66 of liquefier tube 56, and liquefier tube 56 extends through thermal block 58 and heat shield 60.

While liquefier assembly 46 is in its active state, thermal block 58 heats liquefier tube 56 to define heating zone 68. The heating of liquefier tube 56 at heating zone 68 melts the support material of filament 52 in liquefier tube 56 to form melt 70. Preferred liquefier temperatures for the support material range will vary depending on the particular polymer composition of the support material, and are preferably above the melt processing temperature of the support material, while also allowing the support material to remain below its TDKT for the expected residence time in liquefier tube 56.

The upper region of liquefier tube 56 above heating zone 68, referred to as transition zone 72, is preferably not directly heated by thermal block 58. This generates a thermal gradient or profile along the longitudinal length of liquefier tube 56.

The molten portion of the support material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads to print support structure 32 in a layer-by-layer manner in coordination with the printing of printed part 30. While thermal block 58 heats liquefier tube 56 at heating zone 68, cooling air may also be blown through an optional manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is served to its active state for extruding the support material to print a layer of support structure 32, liquefier assembly 44 is switched to a stand-by state to prevent the model material from being extruded while liquefier assembly 46 is being used. After a given layer of the support material is completed, controller 34 then serves liquefier assembly 46 to its stand-by state, and switches liquefier assembly 44 to its active state for extruding the model material to print a layer of printed part 30. This servo process may be repeated for each printed layer until printed part 30 and support structure 32 are completed.

While liquefier assembly 44 is in its active state for printing printed part 30 from a model material filament, drive mechanism 40, liquefier assembly 44, and nozzle 48 (each shown in FIG. 2) may operate in the same manner as drive mechanism 42, liquefier assembly 46, and nozzle 50 for extruding the model material. In particular, drive mechanism 40 may draw successive segments of the model material filament from consumable assembly 22 (via guide tube 26), and feed the model material filament to liquefier assembly 44. Liquefier assembly 44 thermally melts the successive portions of the received model material filament such that it becomes a molten model material. The molten model material may then be extruded and deposited from nozzle 48 as a series of roads onto platen 14 for printing printed part 30 in a layer-by-layer manner in coordination with the printing of support structure 32.

After the print operation is complete, the resulting printed part 30 and support structure 32 may be removed from chamber 12. Support structure 32 may then be sacrificially removed from printed part 30, such as by dissolution in tap water and/or an aqueous solution or dispersion. Examples of suitable removal units for dissolving or disintegrating support structure 32 include those disclosed in Swanson et al., U.S. Pat. No. 8,459,280. Using support removal methodology, support structure 32 may at least partially disintegrate in the aqueous solution or dispersion, separating it from printed part 30 in a hands-free manner.

As mentioned above, the support material of the present disclosure compositionally includes a polymeric matrix that includes a thermoplastic copolymer having two or more different types of monomeric units. The copolymer can include vinyl pyrrolidone (VP) monomeric units and elastomer monomeric units. Copolymers that includes VP monomeric units and elastomer monomeric units may be referred to herein as VP/elastomer copolymer. Elastomeric monomers can include, but are not limited to, acrylate monomers, methacrylate monomers, n-butyl acrylate monomers and combinations thereof. Other elastomeric monomer may also be included as disclosed below and all are within the scope of this disclosure.

The polymeric matrix may also include other polymers. Other polymers that may be included can be, for example, polyethylene oxide and glycol-based polymers; methyl vinyl ether and maleic acid-based polymers; polyoxazoline-based polymer; water soluble polyamides; water soluble polyvinylalcohols; polyvinyl acetates; water soluble polyesters and the like. The support material can include the polymeric matrix and optionally, one or more additives to form a water soluble support material.

The support material compositionally can include a copolymer having VP monomeric units having the following structure.

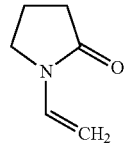

(Formula 1)

Vinyl pyrrolidone monomers are polymerized to form PVP polymers having the following structure:

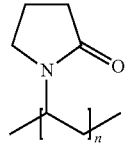

(Formula 2)

where "n" is the number of repeating VP monomer units, which varies depending on the polymer or copolymer. The monomer sequence suggested in Formula 2 is not to be considered limiting of the scope of the invention. Those skilled in the art will recognize that polymerization of VP monomers with one or more elastomeric monomers will produce unique sequences of monomeric units along the backbone of the polymer, forming copolymers for example with random sequences or block sequences.

The elastomeric monomers for copolymerizing with the VP monomers can include, for example, acrylate monomers, methyacrylate monomers, n-butyl acrylate monomers and the like. Other elastomeric monomers may also be utilized and all are within the scope of this disclosure. Suitable elastomeric monomers may include butene and butadiene isomers, 1,3-butadiene, 2-methyl-1,3-butadiene, allyl chloroacetate, vinyl chloroacetate, 2-chloroethyl vinyl ether, and allyl vinyl ethers, including but not limited to methyl vinyl ether, isobutyl vinyl ether, and octadecyl vinyl ether. Suitable elastomeric monomers may include alkoxyalkyl acrylates, including but not limited to methoxyethyl acrylate, methoxymethyl acrylate, ethoxyethyl acrylate, butoxyethyl acrylate, and methoxyethoxyethyl acrylate, and/or acrylic acid esters, including but not limited to methyl acrylate, ethyl acrylate, propyl acrylates, butyl acrylates, amyl acrylates, hexyl acrylates, cyclohexyl acrylates, heptyl acrylates, octyl acrylates, and/or cyanoalkyl acrylates including but not limited to cyanomethyl acrylate, cyanoethyl acrylates, cyanopropyl acrylates, cyanobutyl acrylates, cyanoamyl acrylates, cyanohexyl acrylates, and cyanoheptly acrylates. Suitable acrylic monomers include acrylic acid, methacrylic acid, glycidly methacrylate and other vinyl monomers, such as styrene, alpha-methyl styrene, ethylene, vinyl acetate, and acrylonitrile. Suitable elastomeric monomers may include alpha-olefins, including but not limited to propene, 1-butene, 1-pentene, 3-methly-1-butene, 1-hexene, 3-methyl-1-pentene, 4-methyl-1-pentene, 1-heptene, 3-methyl-1-hexene, 4-methly-1-hexene, 5-methyl-1-hexene, 3-ethly-1-pentene, 1-octene, 3-methyl-1-heptene, 4-methyl-1-heptene, 5-methyl-1-heptene, 6-methly-1-heptene, 3-ethyl-1-hexene, 4-ethyl-1-hexene, 3-propyl-1-hexene, and 1-decene. Suitable monomers may include norbornene and its derivatives, such as 5,6-dimethlyene-2-norbornene and the like. Suitable monomers may include hydroxyl containing monomers, for example hydroxyl propyl methacrylate, hydroxyl ethyl methacrylate, hydroxyl ethyl acrylate, and hydroxyl propyl acrylate. Other suitable hydroxyl containing momomers may include polyethylene glycol monoallyl ethers and the like, including but not limited to ethylene glycol monoallyl ether, diethylene glycol monoallyl ether, and triethylene glycol monoallyl ether, and/or polyethylene glycol monomethacrylate monomers and the like. Suitable monomers may include hydroxyl containing monomers with two or more hydroxyl functional groups, for example 3-allyloxy-1,2-propanediol and 2-(allyloxymethly)-2-ethyl-1,3-propanediol. Examples of other elastomeric monomers include urethane dimethacrylates, such as those commercially sold under the tradename EXOTHANE™ available from Esstech, Inc., from Essington, Pa.

In one preferred embodiment, monomers of n-butyl acrylate having the structure shown below in Formula 3, for example, may be used as an elastomeric monomer in the copolymer of the support material.

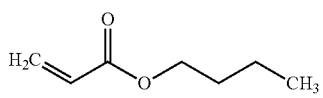

(Formula 3)

The polymeric matrix of the support material includes VP monomeric units and elastomer monomeric units that have been copolymerized through covalent bonding to form the desired copolymer. Copolymers can be formed using two or more types of monomers. The inclusion of the copolymers in the polymeric matrix can increase the toughness of the support material. The rubbery elastic material can be incorporated with VP monomers such that the rubbery phase is advantageously part of the polymer through covalent bonding. Copolymerization of the VP monomers and elastomeric monomers, e.g. attached by covalent bonds, can enable mixing of the two incompatible phases (VP and elastomeric materials) and also improve the water solubility of the support material. Monomers can be monofunctional monomers. Alternatively, the monomers can be multifunctional monomers. Multifunctional monomers may be included to enable or enhance, for example, crosslinking or grafting within the copolymer.

The type of copolymers formed with the monomeric units included in the support material can vary and include, for example, alternating copolymers, periodic copolymers, statistical copolymers, random copolymers, block copolymers, graft copolymers and the like. The copolymers may also include a combination of the different types of copolymers. FIG. 7 illustrates some of the exemplary types of copolymers from two monomeric species that may form the polymeric matrix of the support material described herein. Other types of copolymers may also be included in the support material and are within the scope of the disclosure.

The size of the copolymer formed from the monomers can vary and is dependent on the desired use. The copolymer can have an average molecular weight of at least about 5000 daltons. Preferably, the copolymer can have an average molecular weight of at least about 50,000 daltons. More preferably, the copolymer can have an average molecular weight of between about 100,000 daltons and about 1,000,000 daltons.

As described above, the polymeric matrix may include monomers of VP and elastomeric monomers. The amount or percentage of VP monomers in the polymeric matrix can vary and can depend on the end use of the support material. The amount of VP can be at least about 5 percent by weight of the copolymer. Preferably, the amount of VP monomers can be between about 50 percent by weight and about 90 percent by weight of the copolymer. In an embodiment, the VP monomers are between about 75 percent by weight and about 85 percent by weight of the copolymer.

The amount or percentage of elastomeric monomers in the polymeric matrix can vary and can depend on the end use of the support material. The amount of elastomeric monomers can be at least about 5 percent by weight of the copolymer. Preferably, the amount of elastomeric monomers can be between about 10 percent by weight and about 50 percent by weight of the copolymer. In an embodiment, the elastomeric monomers are between about 15 percent by weight and about 25 percent by weight of the copolymer.

The support material may also include more than one type of elastomeric monomers. The support material, for example, may include two or more different types of elastomeric monomers in addition to the VP monomers. Elastomeric monomers, e.g. n-butyl acrylate and methylacrylate, may be used in some embodiments along with the VP monomers.

Selection of the particular blend of VP monomers and the elastomeric monomer(s) for copolymerization can be dependent on the TDKT and/or HDT of the support material in a desired build environment and the maintenance of the disintegration characteristics in aqueous solution such as tap water. The average molecular weight of the copolymers as well as the particular type and amount of the elastomeric monomers may affect the melting temperature ($T_m$), the glass transition temperature ($T_g$), the HDT and/or the TDKT. The addition of the elastomeric monomers and/or increasing the percentage of the elastomeric monomers in the support material can lower the HDT and/or TDKT of the support material in a particular build environment. Preferably, the decrease in the TDKT and/or HDT in a particular build environment by the inclusion of the elastomeric monomers is balanced with improved properties such as improved toughness, i.e. reduced brittle characteristics. The inclusion of elastomeric monomers can influence the flow characteristics of the support material leading to an improved printing process. Inclusion of elastomeric monomers preferably maintains or aids in dissolution rates in aqueous solutions or other desirable properties.

The support material may include only the VP/elastomer copolymer in the polymeric matrix. Alternatively, the polymeric matrix of the support material may include other polymeric material in addition to the VP/elastomer copolymer. Other polymers may be included in the polymeric matrix to obtain suitable properties for the support material such as the desired $T_g$, thermal stability, rheological properties and the like. The amount of VP/elastomer copolymer can be at least about 10 percent by weight of the polymeric matrix. Preferably, the amount of VP/elastomer copolymer is between about 70 percent by weight and about 100 percent by weight of the polymeric matrix.

The support material can optionally include one or more additives. The additives can be, for example, rheology modifiers, impact modifiers, elastomers and combinations thereof. The support material may also include additives such as colorants, fillers, plasticizers, surfactants, reinforcing materials (e.g. fibers, microspheres, platelets), polymer stabilizers (e.g., antioxidants, light stabilizers, ultraviolet absorbers, and antiozonants), biodegradable additives, and combinations thereof. Other additives may also be added that do not reduce the thermal stability, the HDT or disintegration in water of the support material and are within the scope of the invention.

The support material may include a rheology modifier. Rheology modifier can be any polymer(s) and/or compound(s) that modify the thermal characteristics and flow characteristics and may increase the toughness of the polymeric matrix described herein. Rheology modifiers can be polymers and/or plasticizers. Rheology modifiers can be, for example, low viscosity anionic polymers, citrates, polyethylene glycol (PEG) and/or polypropylene glycol (PPG) and their copolymers, fatty acid esters, fatty acid amides, phthalate plasticizers, vinyl acetate polymers and copolymers, waxes, wax esters, amide waxes, polyol esters, silicone polymers, metal soaps, polyalkylene glycols, functionalized naturally occurring oils and the like. Non-limiting examples of polyalkylene glycols include polyethylene glycols sold under the CARBOWAX® tradename by Dow Chemical Co. located in Midland, Mich. Non-limiting examples of functionalized naturally occurring oils include: malinated or epoxidized soybean, linseed or sunflower oils, which are commercially available from Cargill, Inc. located in Minnetonka, Minn. In some exemplary embodiments, the rheology modifier is a lower molecular weight PVP that can have an average molecular weight of less than about 450,000 daltons, preferably less than about 40,000 daltons.

Rheology modifying additives can also be plasticizers. Plasticizers can include, but are not limited to, dialkyl phthalates, cycloalkyl phthalates, benzyl and aryl phthalates, alkoxy phthalates, alkyl/aryl phosphates, polyglycol esters, pyrrolidones, adipate esters, citrate esters, esters of glycerin, and combinations thereof. Exemplary rheology modifying additives include monofunctional propylene glycol, 2-pyrrolidone, vinyl acetate and tributyl citrate.

The support material may include rheology modifiers of at least about 5% by weight of the support material. In some embodiments, the support material includes rheology modifiers of at least about 10% by weight. In some preferred embodiments, the amount of the rheology modifiers is between about 5% by weight and about 25% by weight. The amount of the rheology modifiers in the support material can be dependent on the desired characteristics of the support material. In embodiments that include plasticizers, preferred concentrations of the plasticizers in the support material range from about 5% to about 20% by weight.

The support material may also include one or more impact modifiers as an additive. In embodiments that include impact modifiers, preferred concentrations of the impact modifiers in the support material are less than about 20% by weight. More preferred concentrations include impact modifiers at about 15% by weight or less of the support material. In an exemplary embodiment, the concentration of the impact modifier is about 10% by weight. Support materials without impact modifiers or with concentrations of greater than about 20% by weight may also be suitable and are within the scope of the description. Suitable impact modifiers preferably increase the toughness of the support material, thereby increasing the strength of the support material feedstock and the resulting support structure without adversely affecting the disintegration of the support material in an aqueous solution or dispersion. Suitable impact modifiers for use with the VP/elastomer copolymer include, but are not limited to, block copolymer impact modifiers, core-shell impact modifier, polydimethylsiloxane (PDMS) based modifiers, polybutadiene polymers, polyamides, room temperature vulcanized (RTV) silicone, thermoplastic vulcanizates thermoplastic elastomers and the like.

Core-shell impact modifiers usually consist of a core having engineered thermoplastics or elastomers grafted with a second component. The core-shell impact modifiers can be, for example, acrylic core shell modifiers. Suitable block copolymers include copolymers of acrylic monomers, such as methyl methacrylate and butyl acrylate. Blocks of methyl methacrylate monomer provide thermal stability and modulus to the polymer, while blocks of butyl acrylate provide toughness and elasticity. In addition, polar monomers, such as acrylic acid or acrylonitrile may be added to the block copolymer to increase polarity and compatibility with PVP polymer. Examples of acrylic block copolymers include the product line from Arkema, Inc. located in King of Prussia, Pa. having the NANOSTRENGTH® and DURASTRENGTH® tradenames and the product line from Kuraray Co., Ltd. located in Kurashiki City, Japan under the KURARITY® tradename. In some embodiments, the core-shell impact modifier can be of the type methacrylate-butadiene-styrene (MBS). Examples of MBS impact modifiers include the product line from Arkema, Inc. located in King of Prussia, Pa. having the CLEARSTRENGTH® tradename. Commercially available examples of both acrylic core-shell and MBS core-shell impact modifiers can be also be found in the products under the PARALOID™ tradename from Dow Chemical Company of Midland, Mich.

Suitable impact modifiers can also include epoxy-functional polyolefins (e.g., polyethylenes and polypropylenes). Suitable epoxy-functional polyethylenes include copolymers of ethylene monomer units and epoxy monomer units that include epoxy-terminated carboxylate ester groups. Preferred impact modifiers include copolymers of ethylene, and glycidyl methacrylate, and optionally one or more alkyl (meth)acrylates such as butyl acrylate.

The support material may also include an additional elastomer as an additive. The additional elastomers are included in the support material as a polymerized component of the support material. This is in contrast to the elastomeric monomers that are mixed together prior to the formation of the copolymer and are present during the copolymerization. Suitable additional elastomers may also act as impact modifiers and include the elastomeric compounds disclosed herein. Additional elastomers can aid in reducing the brittleness of the support material and enable the support material, e.g. a filament, to traverse the pathway within the printing system with diminished or no breakage.

Elastomers, however, can change the properties of the support material such as $T_g$ and HDT. The amount of elastomers included can balance the need for reduced brittleness while maintaining the desired properties of $T_g$ and HDT.

The additional elastomers that can be utilized are, for example, polyamides, elastomeric copolyesters, polyakylene glycols and functionalized naturally occurring oils. Examples of elastomeric polyesters include, but are not limited to, those sold under the NEOSTAR® tradename by Eastman Chemical Co., located in Kingsport, Tenn., the BIOMAX® by E.I. du Pont de Nemours and Company located in Wilmington, Del. and Hytrel® tradename by E.I. du Pont de Nemours and Company located in Wilmington, Del. Non-limiting examples of polyalkylene glycols include polyethylene glycols sold under the CARBOWAX® tradename by Dow Chemical Co. located in Midland, Mich. Non-limiting examples of functionalized naturally occurring oils include: malinated or epoxidized soybean, linseed or sunflower oils, which are commercially available from Cargill, Inc. located in Minnetonka, Minn. Suitable elastomers can include water and/or alcohol soluble polyamides. Suitable water and/or alcohol soluble polyamides include the AQ Nylon products from Toray Industries Inc. of Tokyo, Japan. In a preferred embodiment, the elastomer includes less than 25% by weight of a water soluble polyamide, and in a more preferred embodiment includes less than 20% of a water soluble polyamide. Suitable elastomers can also include epoxy-functional polyolefins (e.g., polyethylenes and polypropylenes). Suitable epoxy-functional polyethylenes include copolymers of ethylene monomer units and epoxy monomer units that include epoxy-terminated carboxylate ester groups. Preferred elastomers include copolymers of ethylene, and glycidyl methacrylate, and optionally one or more alkyl (meth)acrylates such as butyl acrylate. However, in some embodiments, the impact modifier includes less than 5% by weight of alkyl (meth)acrylates, and in further embodiments is substantially free of, or completely free of, alkyl (meth)acrylates (e.g., butyl acrylate).

When the additional elastomers are included in the support material, the additional elastomers may be directly combined or blended into the copolymerized VP/elastomer polymeric matrix. Alternatively, the elastomer can be pre-compounded with another polymer prior to blending with the VP/elastomer polymeric matrix.

The amount of the additional elastomer in the support material can be between about 1 percent by weight and about 25 percent by weight. Preferably, the amount of the additional elastomer in the support material is between about 5 percent by weight and about 20 percent by weight. It is also contemplated that the support material includes no additional elastomer.

In embodiments that include colorants, preferred concentrations of the colorants in the support material range from about 0.1% to about 5% by weight. Suitable colorants include titanium dioxide, barium sulfate, carbon black, and iron oxide, and may also include organic dyes and pigments. It is also contemplated that the support material includes no colorants.

In embodiments that include fillers, preferred concentrations of the fillers in the support material range from about 1% to about 75% by weight. Suitable fillers include, but not limited to, calcium carbonate, magnesium carbonate, glass spheres, graphite, carbon black, carbon fiber, glass fiber, talc, wollastonite, mica, alumina, silica, kaolin, silicon carbide, zirconium tungstate, zinc oxide, soluble salts, e.g. sodium chloride and combinations thereof. It is also contemplated that the support material contain no fillers.

The VP/elastomer copolymers in the support materials can increase the thermal stability of the support material to be suitable for build environments of greater than about 80° C., preferably greater than about 120° C. If the level of elastomeric monomers in the copolymer of a support material is too high, the thermal stability of the support material can decrease to a point where it cannot be printed without exceeding its TDKT. Accordingly, in addition to achieving the desired thermal stability for the build environments, the VP/elastomer copolymers are also preferably balanced such that the support material can be printed without exceeding its TDKT.

The support materials with the VP/elastomer copolymers are also preferably balanced such that the melt processing temperatures of the support materials are compatible with the model materials and are suitable for a variety of melt processing temperatures. The melt processing temperatures can be greater than about 80° C. In alternative embodiments, the melt processing temperatures can be greater than about 240° C. The melt processing temperatures may be greater than about 350° C. The support materials may also be compatible with model materials suitable for melt processing below 80° C. and these are all within the scope of this disclosure.

The support materials with the VP/elastomer copolymers can have glass transition temperatures that are compatible with high temperature build environments and the associated model materials. The support materials with the VP/elastomer copolymers preferably have $T_g$ of greater than about 100° C. More preferably, the support materials with the VP/elastomer copolymers have $T_g$ between about 100° C. and about 200° C.

When used in system 10, the support material requires sufficient thermally stability to be melted in liquefier tube 56 and extruded from nozzle 50 without appreciable thermal degradation, which can expose the support material to a melt processing temperature for durations of 3-10 seconds, or longer in some cases (e.g., 5 seconds, 10 seconds, 30 seconds, 1 minute, 5 minutes, 10 minutes, 30 minutes, and the like). Preferably, the support material is printable with an additive manufacturing system (e.g., system 10) such that less than 10% by weight of the thermoplastic copolymer thermally degrades during the printing operation. More preferably, less than 5% by weight, even more preferably less than 1% by weight, and even more preferably less than 0.5% by weight of the thermoplastic copolymer thermally degrades during the printing operation.

As mentioned above, in some embodiments, chamber 12 may be heated to one or more elevated temperatures. Preferably, the temperature within chamber 12 is set such that a temperature at the build plane below print head 18 is held within about 30° C. below an average or bulk glass transition temperature of the part and support materials (which are preferably similar or the same), more preferably within about 25° C. the average or bulk glass transition temperature, and even more preferably within about 20° C. below the average or bulk glass transition temperature. Examples of suitable set point temperatures for chamber 12 include those greater than about 80° C., greater than 120° C., greater than about 150° C., and/or about 180° C.

With respect to the solubility of the support material, it is readily capable of being disintegrable in aqueous solutions. The aqueous solutions may have a pH of less than about 8. The aqueous solution may be between about pH 6 and about pH 8. Preferably, the aqueous solution is about pH 7. In a preferred embodiment, the aqueous solution is tap water. Therefore, in addition to being a high-temperature support material, it can also be removed in a hands-free manner with tap water and/or other aqueous solutions or dispersions. Examples of suitable disintegration rates, pursuant to the Disintegration Test discussed below, include rates of at least about 3.0% by weight/minute, more preferably at least about 3.5% by weight/minute, and even more preferably at least about 4.0% by weight per minute. Furthermore, the aqueous solution is not required to be heated but rather can be utilized at its ambient temperature. In some embodiments, heating of the aqueous solution can be alternatively used to increase the disintegration rate further.

The present description also includes methods of making the support material and using the support material in printing parts. The method for making the support material can include copolymerizing the VP monomers and the elastomeric monomers. The copolymerization is generally initiated by the addition of an initiating agent to a mixture of the VP and elastomeric monomers. Numerous initiating agents are known in the art to initiate polymerization reactions and may be suitable for the copolymerization. Suitable initiating agents include, for example, free radical acrylate initiating agents and the like. In an embodiment, 2,2-azobis-(2-methylbutyronitrile) sold under the Vazo®67 tradename manufactured by E.I. du Pont de Nemours and Co. located in Wilmington, Del. is utilized as an initiating agent. Any suitable initiating agents can be used and all are within the scope of this description.

The amount of initiating agents utilized is dependent on the amount and type of monomers used to form the support material. The amount of initiating agent are typically between about 0.025 percent by weight and about 1 percent by weight of the monomers. However, any suitable amount of initiating agents can be utilized to initiate the necessary polymerization to form the support material.

The copolymerization can be initiated with all of the desired monomers in the reaction vessels. Alternatively, polymerization may be initiated with one or more of the desired monomers and after partial polymerization additional one or desired monomers may be added to the reaction mixture. Alternatively, the desired amount of monomers can be added to the reaction vessel and the initiating agents can be added over time. The copolymerization may be conducted in a variety of suitable solvents and can include, for example, water, ethanol, butanol, isopropyl alcohol, toluene, dioxane, dimethyl sulfoxide, n-methylpyrrolidone, and the like. In preferred embodiments, the solvent is water or ethanol.

Chain transfer agents, such as alkyl thiols, can be used to control the molecular weight and distribution of the polymer during polymerization. Suitable train transfer agents for polymerization include alkyl thiols. In a preferred embodiment, the chain transfer agent is 1-dodecanethiol. Suitable amounts of chain transfer agents added to the polymerization are generally between zero and 1% of the monomer composition. Alternatively, no chain transfer agent may be used.

As the polymerization reaction is exothermic, the rate of polymerization is typically controlled to prevent thermal degradation of the polymeric material. The temperature can be controlled by metering or adding the initiating agent over time to substantially maintain a reaction temperature. The temperature can also be controlled by metering or adding the monomers to the initiating agent over time to substantially maintain the reaction temperature. A typical reaction temperature is between about 20° C. and about 100° C. A more typical reaction temperature is between about 70° C. and about 85° C.

The polymerization is typically reacted in a solvent such that the material is boiling for a selected amount of time. The vapor caused by boiling is condensed and refluxed back into the reaction vessel. A stream of an inert gas, such as, but not limited to nitrogen, is piped into the reaction chamber to maintain an inert gas blanket within the reaction chamber. Monomer and initiator solutions prepared for addition into the reaction vessel can also selectively be prepared in non-oxygenated or oxygenated atmospheres. For example, solvent is generally prepared under non-oxygenated conditions, but solutions of acrylate monomers are prepared under oxygen so that stabilizers within the monomer raw materials function properly. Multiple injections of initiator solution may also be used to control the rate of polymerization, maintaining safe operating conditions and preventing a dangerous exothermic reaction. Near completion of the polymerization, an additional amount of initiator may be used as a final step to fully convert any remaining monomer solution into polymer. The process and process conditions are described in greater detail in the Examples.

When the copolymerization is complete or substantially complete, the copolymer solution may be further processed by removal of the solvent and drying of the copolymer. The copolymer may be dried with heat under a vacuum to dry the copolymer. The dried copolymer can be further ground to a powder and/or annealed. The copolymers may be in the form of powders, particles, liquids, resins or other forms suitable for combining with other components of the support material mixture.

The copolymer may be further combined with other polymers and/or one or more of the additives described above to form the support material mixture. The support material mixture can then be processed, for example, melt processed to form the support material into a desirable form. The processing, for example, may be subjecting the support material mixture to multiple extrusion cycles in order to ensure blending of all the components. In an exemplary embodiment, the support material mixture is processed, for example, by twin-screw extrusion. The resultant support material product may be recovered and dried. The dried, support material may be used directly to form the desired consumable material (e.g. a filament or powder).

The support material may also be formed in multiple steps. For example, some of the components may be pre-compounded first and then the pre-compounded material may be melt processed with the copolymeric material and additional polymers and/or additives, impact modifiers, and the like as described herein. Alternatively, all of the components may be combined and melt processed in one step.

Preferably, support material mixtures with different types of elastomeric monomers and/or concentrations of elastomeric monomers can be used to produce a wide range of copolymers that can then be utilized to generate support materials with differing physical properties and thermal stabilities to be used at various build temperatures. This can reduce production costs for manufacturing support materials for pairing with different model materials.

The resulting support material may then be formed into a desired media for use with an additive manufacturing system. The desired media can be consumable assemblies that include, for example, filaments, powders and the like as described herein.

For example, the support material may be melt processed and extruded to produce filament 52 for use in system 10.

Figure 4D:
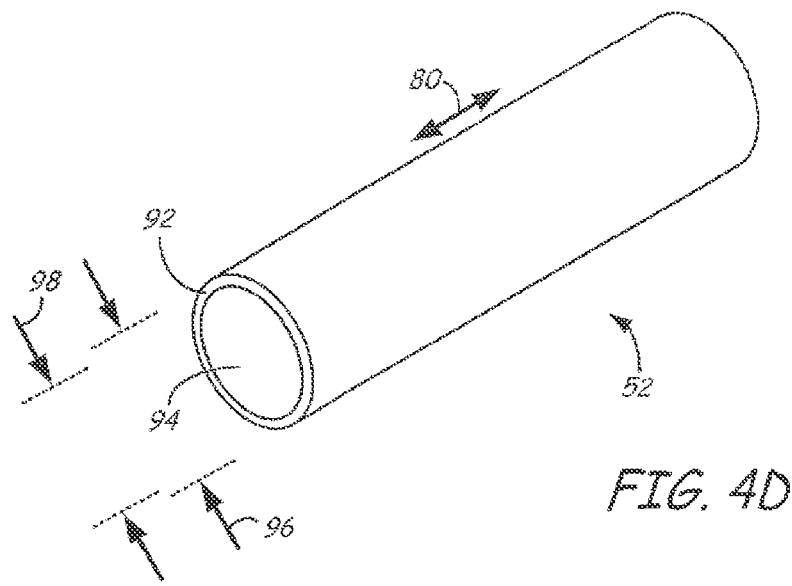
FIG. 4D is a perspective view of a segment of a cylindrical core-shell filament of the support material.

FIGS. 4A-4E illustrate example embodiments for filament 52 produced with the support material of the present disclosure. As shown in FIG. 4A, filament 52 may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. For example, filament 52 may have a longitudinal length 80 and an average diameter (referred to as diameter 82) along longitudinal length 80. As used herein, the term "average diameter" of a filament (e.g., diameter 82) is an average based on a 100-foot segment length of the filament. Diameter 82 may be any suitable dimension that allows filament 52 to be received by a print head of an additive manufacturing system (e.g., print head 18).

Alternatively, as shown in FIG. 4B, filament 52 may have a non-cylindrical geometry, such as a ribbon filament as disclosed in Batchelder et al., U.S. Pat. No. 8,221,669. It is understood that "ribbon filament" may have a rectangular cross-sectional geometry with right-angle corners and/or with rounded corners such as an elliptical or a round geometry. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

Furthermore, as shown in FIG. 4C, filament 52 may alternatively have a hollow geometry. In this embodiment, filament 52 may have a longitudinal length 80, an average outer diameter (referred to as outer diameter 88) along longitudinal length 80, and an average inner diameter (referred to as inner diameter 90) along longitudinal length 80.

Figure 4E:
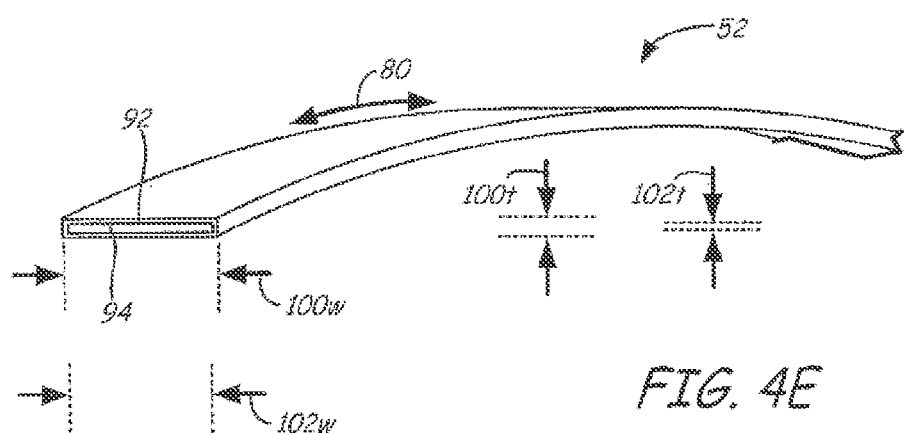
FIG. 4E is a perspective view of a segment of a ribbon core-shell filament of the support material.

Additionally, as shown in FIGS. 4D and 4E, filament 52 may alternatively have a core-shell geometry, as mentioned above, where the support material may be used to form either the core or the shell. For instance, the support material of this embodiment may function as a soluble shell in combination with a bulk core of a second polymer material, such as a second soluble support material having a lower mechanical strength and modulus, but that has a higher dissolution rate in the aqueous solution. Alternatively, the support material may function as a soluble core in combination with a second soluble support material that exhibits exceptional adhesiveness to an associated model material.

In either the cylindrical embodiment shown in FIG. 4D or the ribbon embodiment shown in FIG. 4E, filament 52 may have a longitudinal length 80, a shell portion 92, and a core portion 94, where the shell portion 92 and core portion 94 each preferably extend along longitudinal length 80. In further alternative embodiments, filament 52 may three or more cross-sectional portions (e.g., a core portion and two or more shell portions).

Alternatively, in the ribbon embodiment shown in FIG. 4E, which is a combination of the embodiments shown above in FIGS. 4B and 4D, shell portion 92 may have an average outer width (referred to as outer width 100w) and an average inner width (referred to as inner width 102w) along longitudinal length 80, where inner width 102w corresponds to an outer width of core portion 94. Similarly, shell portion 92 may have an average outer thickness (referred to as outer thickness 100t) and an average inner thickness (referred to as inner thickness 102t) along longitudinal length 80, where inner thickness 102t corresponds to an outer thickness of core portion 94. Examples of suitable core-shell geometries for this embodiment (e.g., widths 100w and 102w, and thicknesses 100t and 102t) include those discussed in Mikulak et al., U.S. Publication Nos. 2012/0070619 and 2012/0231225, and those discussed above for the ribbon filament 52 in FIG. 4B.

Consumable assembly 24 may include any suitable length of filament 52 as illustrated in FIGS. 4A-4E. Thus, longitudinal length 80 for filament 52 in the embodiments shown in FIGS. 4A-4E is preferably about 100 feet or more. In additional embodiments, filament 52 (e.g., as shown in FIGS. 4A-4E) may include topographical surfaces patterns (e.g., tracks) as disclosed in Batchelder et al., U.S. Pat. No. 8,236,227; and/or may include encoded markings as disclosed in Batchelder et al., U.S. Pat. No. 8,658,250.

Figure 5A:
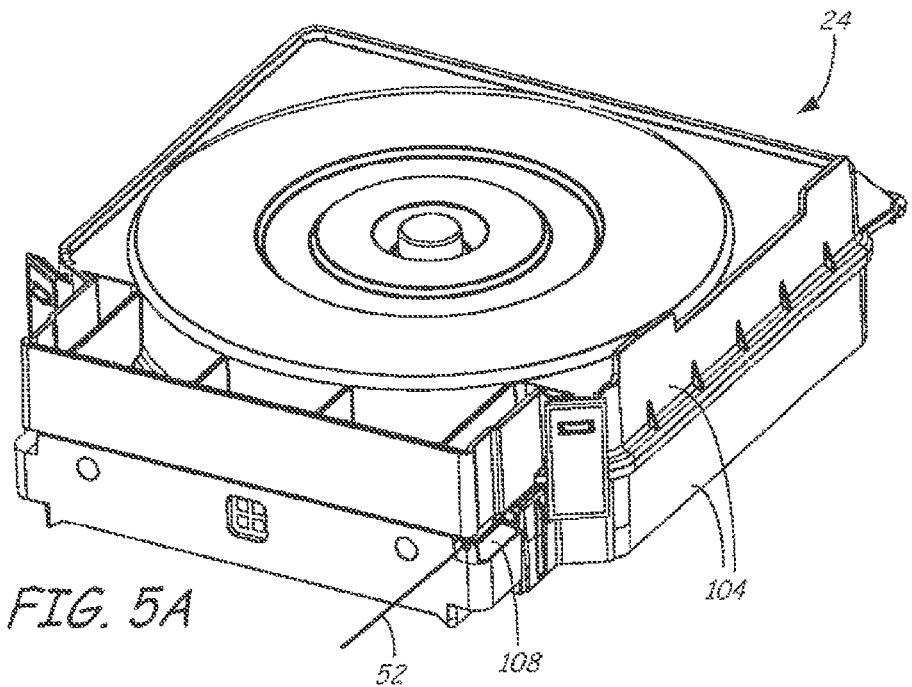
FIG. 5A is a perspective view of a first embodied consumable assembly for retaining a supply of the support material in filament form.
Figure 5B:
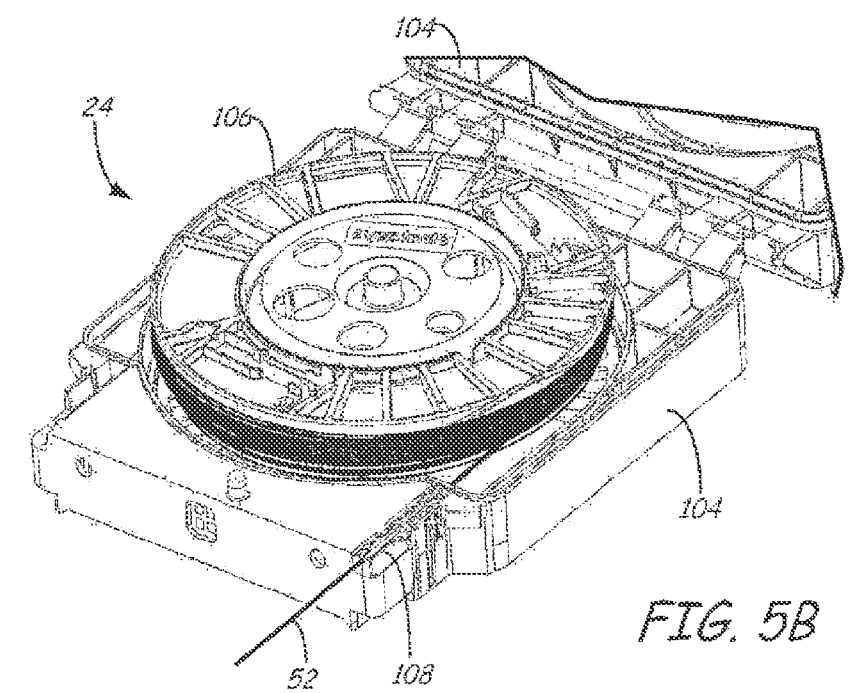
FIG. 5B is a perspective view of the first embodied consumable assembly in an open state, illustrating an interior of the first embodied consumable assembly.

FIGS. 5A-6C illustrate examples of suitable consumable assemblies for consumable assembly 24, which may retain a supply of filament 52 of the support material. For example, FIGS. 5A and 5B illustrates consumable assembly 24 with a container portion 104, spool 106, and guide mechanism 108, where container portion 104 is configured to open and close in a sealing manner as shown to retain spool 106 and guide mechanism 108. Spool 106 accordingly retains a supply of filament 52 of the support material, and relays filament 52 out of consumable assembly 24 via guide mechanism 108.

Figure 6C:
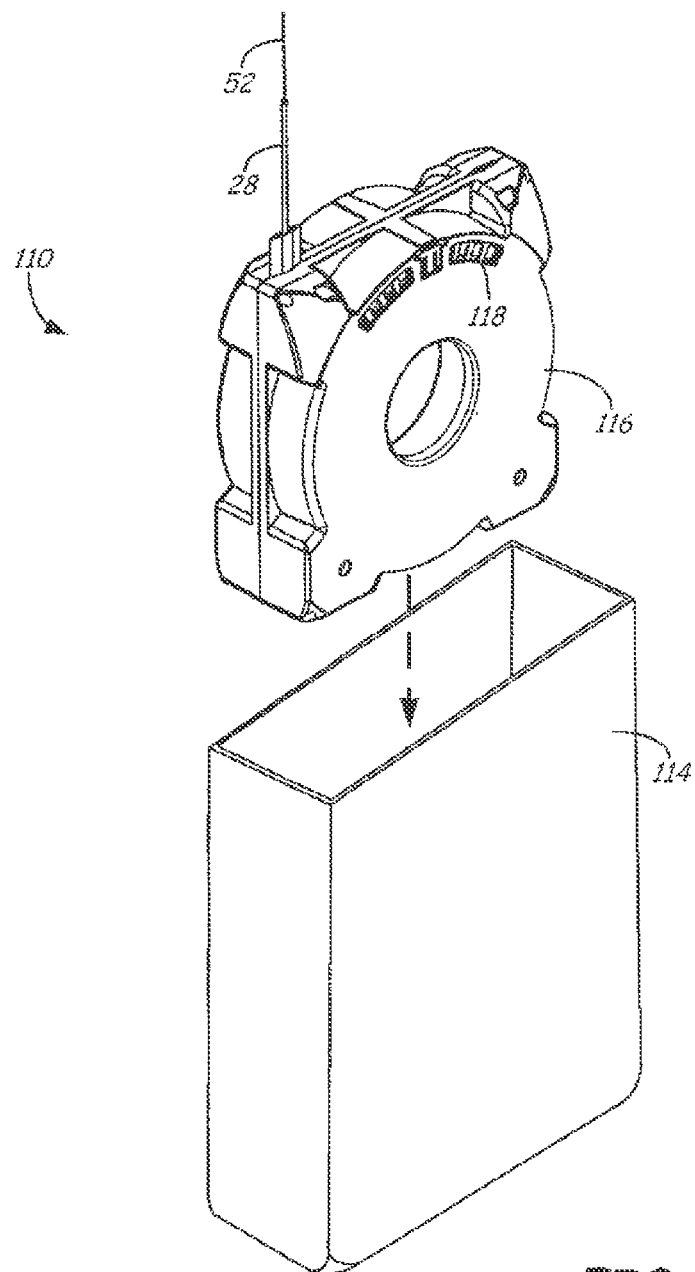
FIG. 6C is a perspective view of a container portion of the second embodied consumable assembly.

FIGS. 6A-6C illustrate an alternative embodiment for print head 18, consumable assembly 24, and guide tube 28, which are combined into a single, removable assembly, such as disclosed in Mannella et al., U.S. Publication Nos. 2013/0161439 and 2013/0161442. As shown in FIG. 6A, in this embodiment, consumable assembly 24 preferably includes container portion 110, which may be retained in a storage box 112, and is configured to mount print head 18 and guide tube 28.

As shown in FIG. 6B, print head 18 and guide tube 28 may be unmounted from container portion 110 and loaded to system 10 such that print head 18 is moveably retained by gantry 20, such as disclosed in Swanson, U.S. Publication Nos. 2010/0283172 and 2012/0164256. As shown in FIG. 6C, container portion 110 may include liner 114, rigid module 116, and spool 118, where spool 118 is rotatably mounted within rigid module 116 and retains a supply of filament 52 of the support material. Rigid module 116 may also be secured within liner 114, which is preferably a moisture and/or gas-barrier liner.

In each of the above-discussed embodiments for consumable assembly 24 (e.g., as shown in FIGS. 5A-6C), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In each of the above-discussed embodiments for consumable assembly 24 (e.g., as shown in FIGS. 5A-6C), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In addition to the above-discussed extrusion-based additive manufacturing system, which preferably provides the support material in filament form (e.g., filament 52), the support material may alternatively be provided to an extrusion-based additive manufacturing system in powder form for use in an auger-pump print head, such as disclosed in Bosveld et al., U.S. Publication No. 2013/0333798.

In this embodiment, the support material is preferably pelletized or otherwise micronized and/or classified to attain desired powder particle sizes for use in the auger-pump print head. Examples of suitable average particle sizes for the support material powder range from about 15 micrometers to about 125 micrometers, and in some embodiments from about 20 micrometers to about 50 micrometers.

Moreover, the support material may be provided in powder form for use in other powder-powder-based additive manufacturing systems, such as selective laser sintering systems (e.g., systems disclosed in Deckard, U.S. Pat. Nos. 4,863,538 and 5,132,143), high speed sintering systems, powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the support material is also preferably pelletized or otherwise micronized and/or classified to attain desired powder particle sizes for use in the particular system.

Electrophotography-Based Additive Manufacturing

In another embodiment, the support material is configured for use in an electrophotography-based additive manufacturing system to print support structures, in association with a model material used to print printed parts, with high resolutions and fast printing rates. Examples of suitable electrophotography-based additive manufacturing systems for this embodiment include those disclosed in Hanson et al., U.S. Publication Nos. 2013/0077996 and 2013/0077997, and Comb et al., U.S. Publication Nos. 2013/0186549 and 2013/0186558.

In electrophotography-based methods, during a printing operation, EP engines may develop or otherwise image each layer of the part and support materials using the electrophotographic process. The developed layers are then transferred via a transfer assembly to a layer transfusion assembly where they are transfused (e.g., using heat and/or pressure) to print one or more printed parts and support structures in a layer-by-layer manner. Accordingly, the support material of the present disclosure is preferably thermally stable while being transfused at a layer transfusion assembly.

As mentioned above, the support material is engineered for use in an electrophotography-based additive manufacturing system to print support structures. As such, the support material may also include one or more materials, e.g. charge control agents and/or heat absorbers, to assist in developing layers with EP engine, to assist in transferring the developed layers from EP engine to layer transfusion assembly, and to assist in transfusing the developed layers with a layer transfusion assembly.

Support Structure Removal

After the printing operation is completed with any of the above-discussed additive manufacturing systems, the resulting printed part and support structure may be removed from the system and undergo one or more post-printing operations. For example, the support structure derived from the support material of the present disclosure may be sacrificially removed from the printed part, such as by using an aqueous solution or dispersion. In preferred embodiments, the aqueous solution is a solution with a pH of less than about 9. In more preferred embodiments, the aqueous solution or dispersion has a pH of between about 5 and about 9. In most preferred embodiments, the aqueous solution is tap water that can be utilized at ambient temperatures. Under this preferred soluble technique, the support structure may at least partially disintegrate in the aqueous solution or dispersion, separating it from the printed part in a hands-free manner.

In comparison, the model material is typically chemically resistant to aqueous solutions. This allows the use of an aqueous solution or dispersion to be employed for removing the sacrificial support structure without degrading the shape or quality of the printed part. Examples of suitable systems and techniques for removing support structure in this manner include those disclosed in Swanson et al., U.S. Pat. No. 8,459,280; Hopkins et al., U.S. Pat. No. 8,246,888; and Dunn et al., U.S. Publication No. 2011/0186081.

In some preferred embodiments, the disintegrated support structure may also be collected from the aqueous solution and recycled or otherwise discarded in an environmentally-friendly manner. More preferably, the support material (or any derivative thereof after being subjected to the aqueous solution) is separated from the aqueous solution, collected, and reformulated as fresh support material for subsequent printing operations.

Property Analysis and Characterization Procedures

Various properties and characteristics of the part and support materials described herein may be evaluated by various testing procedures as described below:

1. Glass Transition Temperature

The glass transition temperature is determined using the classical ASTM method employing Differential Scanning Calorimetry (DSC) ASTM D3418-12e1 and is reported in degrees Celsius. The test is performed with a DSC analyzer commercially available under the tradename "DSC 6000" from PerkinElmer, Waltham, Mass. or "DSC 1" from Mettler Toledo, Schwerzenbach, Switzerland, under nitrogen at a heating rate of 10° C./min.

2. Disintegration Rate

The disintegration rate, for measuring the dissolution of a support material copolymer, is determined by initially hot pressing four pellets (0.625-inch diameter and 0.05-inch thickness) at 350° F. and under a 2,000-pound load. The pressed pellets are then vacuum dried at 90° C. for four hours, and each pellet is weighed on an analytical balance. An aqueous solution is then prepared by filling a container with water and stirring with a magnetic stirrer at 70° C. In some embodiments, injection molded ASTM specimens or printed articles may also be used.

Each pellet is then pre-weighed and then placed in the aqueous solution for 3 minutes, 6 minutes, 10 minutes, and 15 minutes (respectively for the four pellets). After each pellet is removed, it is vacuum dried at 90° C. for four hours and weight on an analytical balance to calculate the weight loss for the pellet. The calculated weight loss for each pellet is then plotted against the its dissolving time in aqueous solution. A linear relationship is then formed for the copolymer, and the slope is determined to be the dissolution rate in the units of percent weight loss per minute (-wt %/min).

3. Thermal Stability

The thermal stability of a support material polymer is measured by thermal gravimetric analysis (TGA) with a TGA system commercially available under the tradename "Q500" from TA Instruments, New Castle, Del., or "TGA 1" from Mettler Toledo, Schwerzenbach, Switzerland under nitrogen, and at a heating rate of 10° C./min. The thermal stability of the support material may be referenced by a weight percentage of thermal degradation over a given exposure duration.

For example, the thermal stability of a given thermoplastic copolymer may be characterized such that less than 10% by weight of the thermoplastic copolymer thermally degrades when the thermoplastic copolymer is exposed to a given melt processing temperature (e.g., 250° C.) for a 10-second duration. Other weight percents may also be referenced, such as less than 5% by weight, less than 1% by weight, and less than 0.5% by weight, and the like; and any suitable duration may be referenced, such as 5 seconds, 10 seconds, 30 seconds, 1 minute, 5 minutes, 10 minutes, 30 minutes, and the like. Combinations of these weight percent and duration references may also be used.

EXAMPLES

The present disclosure is more particularly described in the following examples that are intended as illustrations only, since numerous modifications and variations within the scope of the present disclosure will be apparent to those skilled in the art.

Example 1

The general laboratory polymerization procedure for synthesizing the copolymer of the present disclosure is provided in this example. The initiator Vazo®67, 2,2'-azobis(2-methylbutyronitrile), manufactured by E.I. du Pont de Nemours and Co. located in Wilmington, Del., was used to initiate the polymerization reaction in two additions for a total of 0.105 mol percent, relative to the total monomer amount. 44% of the total amount of initiator Vazo®67 was used for the first addition. The Vazo®67 was poured into a 500 mL flask, and the flask was purged thoroughly with nitrogen. 95 g of ethanol purged with nitrogen was added to the flask and the solution was heated to reflux at 75° C. for 30 minutes. 1-dodecanethiol chain transfer agent (0.25 mol % relative to the total monomer amount) were weighted into a round bottom flask with the monomers open to air and were mixed thoroughly with a mechanical stirrer. As acrylates are prone to spontaneous, violent self-polymerization they must never be handled or stored under nitrogen. The stabilizer requires oxygen to function properly. After 30 minutes of mixing, the monomer and chain transfer agent mixture was transferred into a glass syringe, which was mounted onto a syringe pump. The monomer addition was performed continuously at a rate of 1.0 mL/min so that the internal temperature of the reaction flask did not exceed 83° C. The mixture was mechanically stirred for an additional hour at 82° C. oil bath temperature after the monomer addition was completed. The remaining 56% of the total Vazo®67 initiator was then dissolved in 5 g of oxygen-free ethanol and added to the polymerization. The polymerization was carried out for an additional three hours. During the whole polymerization time, a slight nitrogen stream was maintained. The polymer solution was diluted with 75 mL of ethanol and transferred into a 2 L round bottom flask. The solvent was removed by a rotary evaporator at 70° C. and 20 mbar of pressure. The residue was dried overnight at 90° C.<0.1 mbar. The polymer was ground to a powder and was dried overnight at 100° C.<100 mbar in a vacuum oven. The dried powder was then annealed at 220-230° C. for 30 minutes under vacuum. The glass transition temperature, Tg, was measured from each copolymer composition. In the event of more than one Tg observed, the highest temperature reading was recorded. Specific viscosity of the copolymer in ethanol solution was additionally measured by Ubellohde capillary viscosity.

Example 2

The general laboratory procedure of Example 1 was followed to produce a range of copolymer compositions. Exemplary formulations that were synthesized into copolymers using the above procedure are included in TABLE 1 below.

TABLE 1

| SAMPLE | AA % | BA % | MA % | VP % | Yield % | $\eta_{spec}$ | Tg °C. | remarks |
|---|---|---|---|---|---|---|---|---|
| 1 | 75 | 20 | — | 5 | 99 | 0.24 | 112 | |
| 2 | 70 | 20 | — | 10 | 97 | 0.32 | 124 | |
| 3 | 65 | 20 | 5 | 10 | 99 | 0.25 | 128 | |
| 4 | 20 | 20 | — | 60 | 98* | 0.15 | 140 | Incomplete conversion by $^1$H-NMR |
| 5 | 0 | 20 | — | 80 | 97 | 0.49 | 186 | |
| 6 | 20 | 10 | 10 | 60 | 95 | n.a. | 123 | Insufficient EtOH solubility |
| 7 | 50 | — | — | 50 | >97 | n.a. | 174 | Insufficient EtOH solubility |
| 8 | 80 | — | — | 20 | >97 | 0.21 | 168 | |

AA: acrylic acid,
BA: n-butyl acrylate,
MA: methacrylic acid,
V: vinylpiridine,
VP: vinylpyrrolidone,
S: styrene Samples were then tested for solubility in several different solutions, including ethanol (EtOH), tap water (TW) and a sodium hydroxide solution of pH>10. Samples 4 through 8, when placed in a bath of tap water at 70° C., disintegrated into a fine suspension and can be washed away. The solubility results are listed in Table 2, below.

TABLE 2

| SAMPLE | $T_g$ °C. | Annealed at 230° C. | | | | Dried at 100° C., No Annealing | | | |
|---|---|---|---|---|---|---|---|---|---|
| | | EtOH | Room Temp. Tap Water | NaOH solution, pH >10 | 70° C. Tap Water | EtOH | Room Temp. Tap Water | 70° C. Tap Water | NaOH solution, pH >10 |
| 1 | 112 | B | C | C | B | B | C | — | B |
| 2 | 124 | B | A | A | C | B | C | — | C |
| 3 | 128 | B | A | A | A | B | C | — | A |
| 4 | 140 | B | C | C | D | B | A | — | A |
| 5 | 186 | — | — | — | — | C | A | D | — |
| 6 | 123 | A | A | A | D | A | — | — | — |
| 7 | 174 | A | A | A | D | A | B | — | C |
| 8 | 168 | A | A | A | D | B | B | — | B |

Legend:
A = insoluble;
B = clear solution;
C = partially soluble;
D = disintegrates into a fine dispersion;
'—' = condition not evaluated The results of synthesis and testing showed very beneficial properties of solubility and high glass transition temperature (Tg), while incorporating elastomeric monomers into the copolymer. Using the protocol above, copolymers with Tg of between about 108° C. and about 180° C. were formed.

Example 3

On the basis of laboratory synthesis findings, a copolymer of VP and nBA was scaled up to a pilot production quantity in a 500 liter synthesis reactor. The polymer composition was chosen to be 80 wt % VP and 20 wt. % nBA monomers (molar composition of 82.1% VP and 17.9% nBA). The monomer mixtures and initiators were prepared using the amounts indicated in Table 3. The initiator Vazo®67, 2,2'-azobis(2-methylbutyronitrile), manufactured by E.I. du Pont de Nemours and Co. located in Wilmington, Del., was used to initiate the polymerization reaction.

TABLE 3

| | set value (kg) |
|---|---|
| NVP | 320 |
| BA | 80 |
| EtOH | 438.44 |
| Initiator 1$^{st}$ Addition | 0.3115 |
| Initiator 2$^{nd}$ Addition | 0.3965 |

The procedure for synthesis was scaled up to a pilot plant. The monomer mixture and the initiator solutions were prepared as in Example 1 and 2. They were degassed and flushed with nitrogen. The temperature was set to 110° C. and the nitrogen flow was eliminated. The initiator solution was refluxed in a condenser and the monomeric mixture was added at 200 liters/hour. The temperature was set to 90° C. and the rate of addition was increased to 300 liter/hour. The rate of addition was slowly increased over approximately two hours to about 600 liters/hour and the mixture refluxed in a 5 condenser system and the temperature was set to 87° C. A second portion of the initiator was added about 3 hours and 20 minutes. The reaction was allowed to proceed for about another 3 hours. The temperature was then set to 70° C. and want then waited for about 25 minutes. After the wait, the polymer was pumped into a holding tank.

The produced polymer was then extruded through a planetary roller extruder (PRE) to devolatize solvent Briefly, the extrusion conditions used with a Planetary Roller Extruder (PRE) include temperatures melting the polymer between about 160° C. and about 255° C. and at pressures between ambient pressure and about 900 mbar below ambient pressure.

Figure 8:
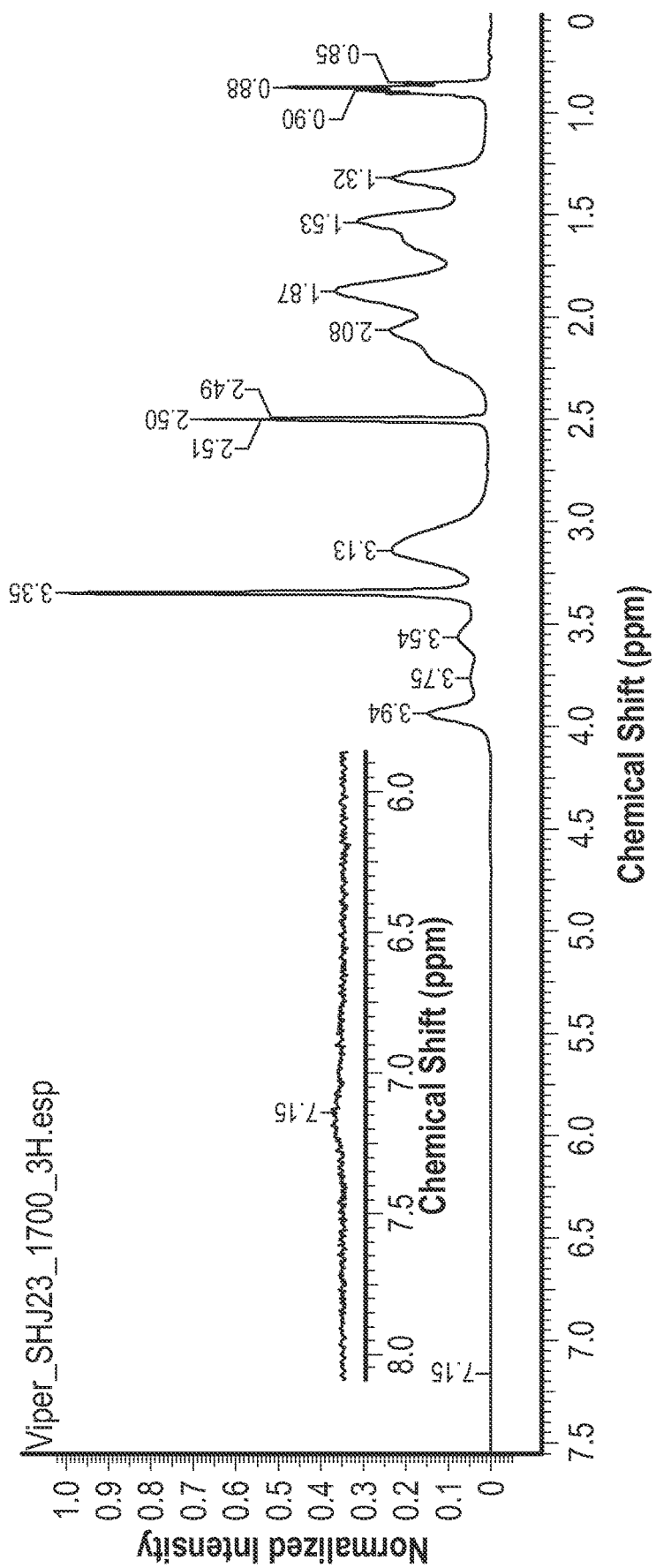
FIG. 8 is a graph of a nuclear magnetic resonance spectroscopy analysis of a vinyl pyrrolidone/elastomer copolymer.
Figure 9:
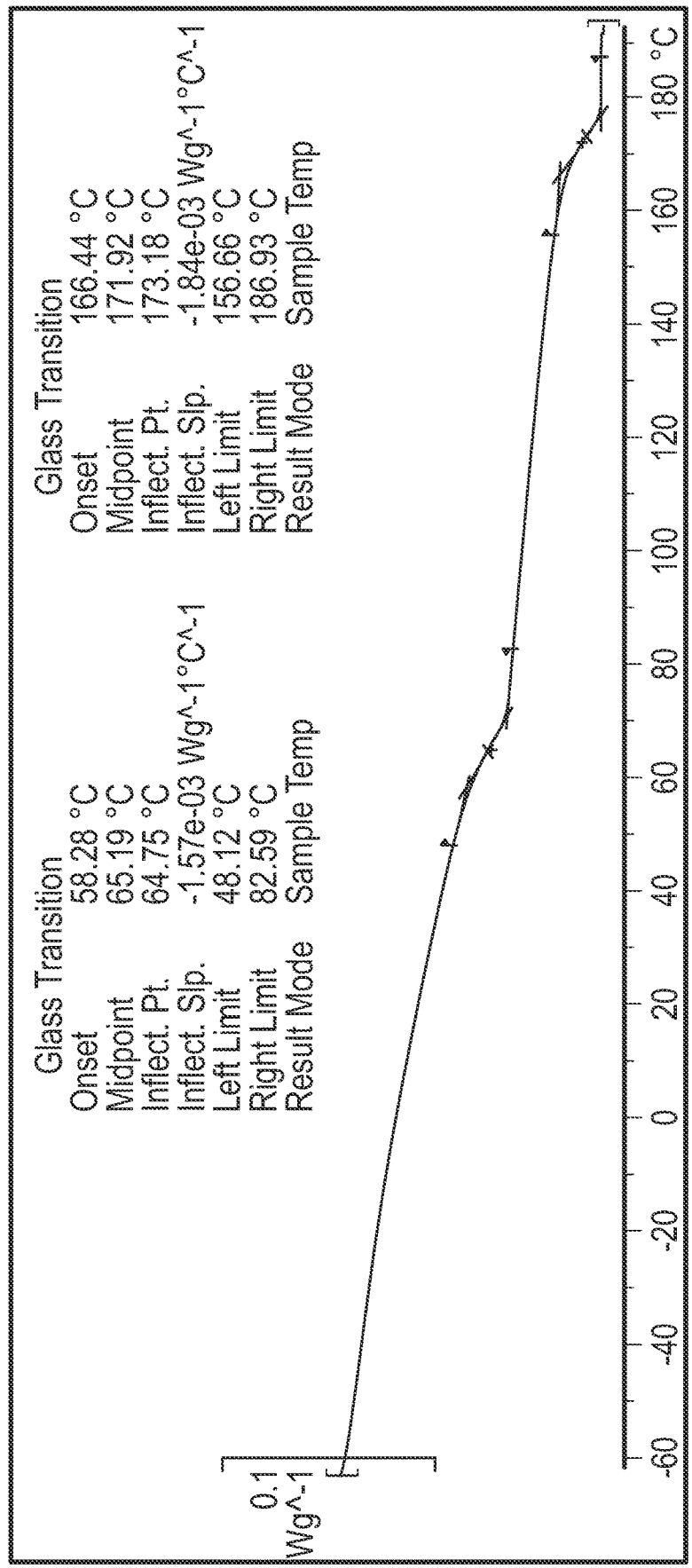
FIG. 9 is a plot from differential scanning calorimetry (DSC) of a support material and identification of the glass transition temperature.
Figure 10:
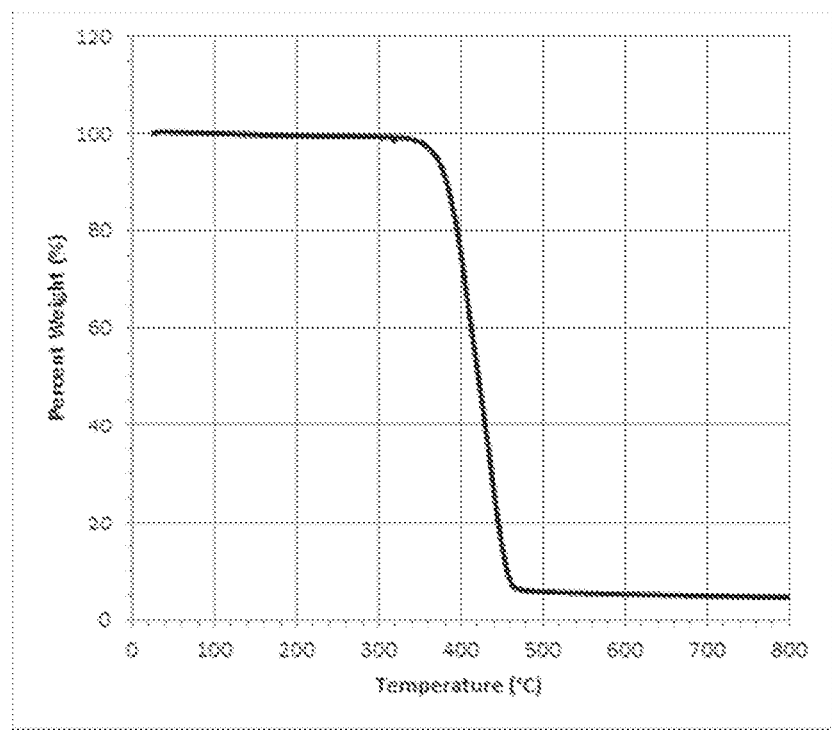
FIG. 10 is a plot of thermal stability by thermal gravimetric analysis (TGA) of the support material.

Polymer extrudate was pelletized from cooled strands. FIG. 8 shows a nuclear magnetic resonance analysis of the product of a scale up process with about 20% Butyl acrylate (BA) and about 80% VP. The residual VP monomer concentration was determined to be less than 250 ppm by high-performance liquid chromatography (HPLC) analysis. The specific viscosity of the pilot plant copolymer was measured to be 0.37 by Ubellohde capillary viscosity. The glass transition temperature of the copolymer was measured by differential scanning calorimetry (DSC), and is shown in FIG. 9. Two Tg values were identified, one at 65° C. and one at 173° C., indicating that the two components of the copolymer preferential create elastomer-rich and vinyl pyrrolidone-rich domains. The thermal decomposition of the copolymer was evaluated by thermogravimetric analysis (TGA) and is show in FIG. 10. The copolymer exhibited substantial thermal stability over 300° C., with 10% mass loss occurring at about 383° C. The solubility in water was verified to be similar for the laboratory polymer and the pilot plant polymer. At 70° C. in local municipal tap water, the copolymer dissolution rate was measured to be 1.5 wt % per minute, forming a cloudy dispersion. The results indicate that the polymer can be scaled up to commercial production.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
   providing a support material comprising a copolymer, wherein the copolymer comprises copolymerized vinyl pyrrolidone (VP) monomeric units and elastomeric monomer units covalently bonded together, wherein the elastomeric monomers are selected from the group consisting of acrylate monomers, methacrylate monomers, n-butyl acrylate monomers and combinations thereof, wherein the support material is disintegrable in an aqueous solution and provided in a media form suitable for the additive manufacturing system; and processing the support material in the additive manufacturing system with a model material to print the three-dimensional part in a layer by layer manner.

2. The method of claim 1 wherein the VP monomers comprise between about 15 weight percent and about 95 weight percent of the copolymer.

3. The method of claim 1 wherein the elastomeric monomers comprise between about 5 weight percent and about 85 weight percent of the copolymer.

4. The method of claim 1 and further comprising:
immersing the part with the support material in the aqueous solution for a selected amount of time to remove the support material from the part, the aqueous selected from tap water and an aqueous solution with a pH between about pH 5 and about pH 9.

5. The method of claim 1, wherein the support material further comprising one or more additives comprising a rheology modifier, an impact modifier, an elastomer and combinations thereof.

6. The method of claim 5, wherein the rheology modifier comprises between about 0.25 weight percent and about 30 weight percent of the support material.

7. The method of claim 5, wherein the impact modifier is about 15% by weight or less of the weight of the support material.

8. The method of claim 5, wherein the impact modifier comprises a block copolymer impact modifier, acrylic core-shell impact modifiers and combinations thereof.

9. A method for making a support material for an additive manufacturing system, the method comprising:
copolymerizing vinyl pyrrolidone (VP) monomeric units and elastomeric monomer units covalently bonded together to form a polymeric matrix, wherein the elastomeric monomers are selected from the group consisting of acrylate monomers, methacrylate monomers, n-butyl acrylate monomers and combinations thereof, wherein the support material comprises the polymeric matrix, the support material disintegrable in an aqueous solution and provided in a media form suitable for the additive manufacturing system.

10. The method of claim 9 wherein the VP monomers comprise between about 15 weight percent and about 95 weight percent of the copolymer.

11. The method of claim 9 wherein the elastomeric monomers comprise between about 5 weight percent and about 85 weight percent of the copolymer.

12. The method of claim 9, wherein the support material further comprising one or more additives comprising a rheology modifier, an impact modifier, an elastomer and combinations thereof.

13. The method of claim 12, wherein the rheology modifier comprises between about 0.25 weight percent and about 30 weight percent of the support material.

14. The method of claim 12, wherein the impact modifier is about 15% by weight or less of the weight of the support material.

15. The method of claim 12, wherein the impact modifier comprises a block copolymer impact modifier, acrylic core-shell impact modifiers and combinations thereof.

16. The method of claim 9 and further comprising:
immersing the part with the support material in the aqueous solution for a selected amount of time to remove the support material from the part, the aqueous selected from tap water and an aqueous solution with a pH between about pH 5 and about pH 9.

\* \* \* \* \*